(12) United States Patent
Loiseau et al.

(10) Patent No.: US 12,499,025 B2
(45) Date of Patent: Dec. 16, 2025

(54) ACTIVITY ASSIGNMENT AND COMPLETION VERIFICATION

(71) Applicant: NOODLE TECHNOLOGY INC., San Francisco, CA (US)

(72) Inventors: Lucien Jean Baptiste Loiseau, San Francisco, CA (US); Garrett Edward Kinsman, San Francisco, CA (US); Micha Anthenor Benoliel, San Francisco, CA (US); Eliott Quentin Eric Teissonniere, San Francisco, CA (US)

(73) Assignee: NOODLE TECHNOLOGY INC., San Francisco, CA (US)

( * ) Notice: Subject to any disclaimer, the term of this patent is extended or adjusted under 35 U.S.C. 154(b) by 5 days.

(21) Appl. No.: 18/719,648

(22) PCT Filed: Dec. 13, 2022

(86) PCT No.: PCT/US2022/081476
§ 371 (c)(1),
(2) Date: Jun. 13, 2024

(87) PCT Pub. No.: WO2023/114789
PCT Pub. Date: Jun. 22, 2023

(65) Prior Publication Data
US 2025/0045181 A1 Feb. 6, 2025

Related U.S. Application Data

(60) Provisional application No. 63/383,229, filed on Nov. 10, 2022, provisional application No. 63/265,350, filed on Dec. 13, 2021.

(51) Int. Cl.
G06F 11/30 (2006.01)
G06F 9/455 (2018.01)
G16Y 40/20 (2020.01)

(52) U.S. Cl.
CPC ...... *G06F 11/3006* (2013.01); *G06F 9/45504* (2013.01); *G16Y 40/20* (2020.01)

(58) Field of Classification Search
CPC .... G06F 11/3006; G06F 9/45504; H04L 9/50; G16Y 40/20
See application file for complete search history.

(56) References Cited

U.S. PATENT DOCUMENTS

2014/0337077 A1  11/2014  Zsebedics et al.
2017/0232300 A1  8/2017  Tran et al.
(Continued)

FOREIGN PATENT DOCUMENTS

CN  110493007 B  7/2021

OTHER PUBLICATIONS

Liu, Han, Dezhi Han, and Dun Li. "Fabric-IoT: A blockchain-based access control system in IoT." IEEE Access 8 (2020): 18207-18218.
(Continued)

*Primary Examiner* — Benjamin M Thieu
(74) *Attorney, Agent, or Firm* — Buchalter; Jason W. Croft

(57) ABSTRACT

A method includes detecting, by an operator server, a mission at a blockchain server. The blockchain server is in communication with the operator server. The method also includes determining, by the operator server, whether the mission meets predefined criteria. In response to a determination that the mission meets the predefined criteria, the method includes exposing at least one device to the mission, the at least one device in communication with the operator server.

20 Claims, 9 Drawing Sheets

(56) References Cited

U.S. PATENT DOCUMENTS

2019/0235489 A1\* 8/2019 Cantrell ................. G05D 1/101
2019/0347652 A1   11/2019 Johnson
2020/0007313 A1\* 1/2020 Vouk ....................... H04L 63/12

OTHER PUBLICATIONS

Z. Gong-Guo and Z. Wan, "Blockchain-based IoT security authentication system," 2021 International Conference on Computer, Blockchain and Financial Development (CBFD), Nanjing, China, 2021, pp. 415-418, doi: 10.1109/CBFD52659.2021.00090.
International Search Report and Written Opinion in PCT/US2022/081476 mailed Mar. 31, 2023.

\* cited by examiner

ACTIVITY ASSIGNMENT AND COMPLETION VERIFICATION

CROSS REFERENCE TO RELATED APPLICATIONS

This U.S. patent application claims priority to Provisional Patent Application 63/265,350 filed on Dec. 13, 2021 and Provisional Patent Application 63/383,229 filed on Nov. 10, 2022. The disclosure of this prior application is considered part of the disclosure of this application and is hereby incorporated by reference in its entirety.

TECHNICAL FIELD

This disclosure relates to assignment of activities and verification of activity completion.

BACKGROUND

Unless otherwise indicated herein, the materials described herein are not prior art to the claims in the present application and are not admitted to be prior art by inclusion in this section.

The Internet of Things (IoT)—the network of connected "smart" devices that communicate seamlessly over the internet—is expanding into every aspect of human life. Increasing, IoT devices are being used for healthcare at hospitals, and in medical device and pharmaceutical manufacturing. In cities, IoT devices help track and monitor pollution. IoT devices can also be used by governments, militaries, companies, and individuals for asset tracking and management. Although these applications serve different purposes, they all share one characteristic—a dependence on strong connectivity. Soon, conventional networks will be unable to handle the bandwidth and power requirements to support connections for billions of IoT devices.

The subject matter claimed in the present disclosure is not limited to implementations that solve any disadvantages or that operate only in environments such as those described above. Rather, this background is only provided to illustrate one example technology area where some implementations described in the present disclosure may be practiced.

SUMMARY

One aspect of the disclosure provides a method. The method includes obtaining, at a blockchain server, a mission. The mission includes a chain code and an address information of a device code. The chain code and the device code are associated with the mission. The chain code is configured to execute on the blockchain server.

Implementations of the disclosure may include one or more of the following optional features. In some implementations, in response to obtaining the mission, the method include updating a mission registry of the blockchain server with the mission. In some implementations, the mission in the mission registry causes an operator server to determine whether the mission meets predefined criteria, and when the operator server determines that the mission meets the predefined criteria, the operator sever exposes at least one device to the mission. The least one device is in communication with the operator server. In some implementations, the operator server exposes the at least one device to the mission by providing the device code. The at least one device is in communication with the operator server. In some implementations, the device code is configured to execute on a virtual machine.

Another aspect of the disclosure provides a method. The method includes obtaining, at a device, a device code from an operator server. The device is in communication with the operator server. The device code is associated with a mission. The method also includes executing, by the device, the device code to carry out the mission.

Implementations of the disclosure may include one or more of the following optional features. In some implementations, executing the device code includes executing the device code on a virtual machine of the device. In some implementations, the method includes determining, at the device, whether the device code is provided by the operator server. In some implementations, the method includes calling back into a chain code on a blockchain server. The chain code is associated with the mission. In some implementations, calling back into the chain code on the block chain server causes the blockchain server to provide compensation for carrying out the mission.

Another aspect of the disclosure provides a method. The method includes detecting, by an operator server, a mission at a blockchain server. The blockchain server is in communication with the operator server. The method includes determining, by the operator server, whether the mission meets predefined criteria. In response to a determination that the mission meets the predefined criteria, the method also includes exposing at least one device to the mission, the at least one device in communication with the operator server.

Implementations of the disclosure may include one or more of the following optional features. In some implementations, the method includes obtaining, at the operator server, a device code associated with the mission, and providing, by the operator server, the device code to the at least one device in communication with the operator server. In some implementations, providing the device code to the at least one device includes causing the device code to execute on a virtual machine of each of the at least one device. In some implementations, the device code is configured to call back into a chain code on the blockchain server. In some implementations, in response to detecting the mission, the method includes obtaining, by the operator server, the mission. In some implementations, the mission includes a chain code associated with the mission, a first address information of a device code associated with the mission, and a second address information of metadata associated with the mission. In some implementations, the chain code is executed at the blockchain server. In some implementations, the method includes obtaining, at the operator server, the device code associated with the mission based on the first address information, and obtaining, at the operator server, the metadata associated with the mission based on the second address information. In some implementations, determining whether the mission meets predefined criteria includes at least one of: determining, by the operator server, whether the device code associated with the mission complies with a restriction, or determining, by the operator server, whether the mission complies with a restriction based on the metadata associated with the mission. In some implementations, the metadata includes at least one of: a mission category of the mission, a reward associating with carrying out the mission, a geographic boundary information, or a device information.

In some implementations, determining whether the mission meets the predefined criteria includes: determining, by the operator server, a set of permissions required to carry out the mission, and determining, by the operator server, that the set of permissions required to carry out the mission complies with a restriction. In some implementations, determining whether the mission meets the predefined criteria includes determining, by the operator server, whether an author of the mission is in a whitelist.

In some implementations, determining whether the mission meets the predefined criteria includes determining, by the operator server, a reward associated with carrying out the mission complies with a restriction. In some implementations, the reward associated with carrying out the mission includes a first reward for the operator server and a second reward for the at least one device.

In some implementations, detecting the mission at the blockchain server includes monitoring a mission registry of the blockchain server. In some implementations, the method includes maintaining, by the operator sever, a status of one or more devices in communication with the operator server. In some implementations, exposing the at least one device to the mission includes exposing the at least one device based on the status of each device in communication with the operator server.

Another aspect of the disclosure provides a method. The method includes obtaining information relating to a first device. The method includes identifying an activity performable by a user of the first device. The method includes sending an activity parameter corresponding to the activity to the first device. The method includes obtaining, from the first device, one or more indicators of completion of the activity. The completion of the activity is based on a comparison of the indicators of completion to the activity parameter. The method includes obtaining, from the first device, data associated with the indicators of completion. The method includes obtaining, from one or more second devices, data associated with the activity, wherein the second devices are selected based on similarities between the first device and the second devices. The method includes validating the completion of the activity by comparing the data obtained from the first device with the data obtained from the second devices. The method includes sending an activity reward to the first device responsive to successful validation of the completion of the activity.

DESCRIPTION OF DRAWINGS

Example implementations will be described and explained with additional specificity and detail through the use of the accompanying drawings in which.

Like reference symbols in the various drawings indicate like elements.

DETAILED DESCRIPTION

Figure 1A:
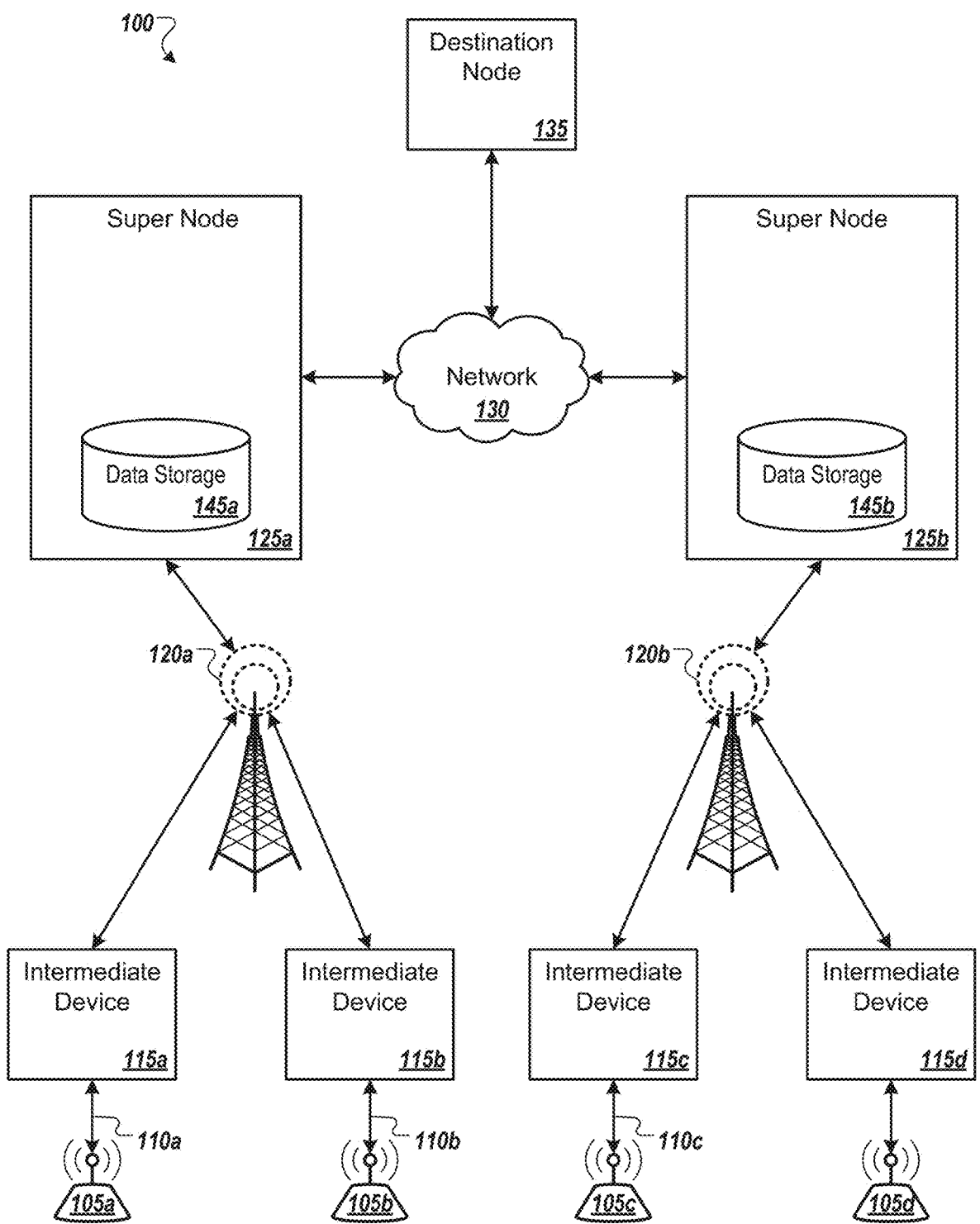
FIG. 1A illustrates an example network architecture in accordance with some implementations of this disclosure.

The Internet of Things (IoT) is expanding into every aspect of human life. IoT devices may include mobile devices owned and carried by most people through their daily lives, such as smartphones or other cellular telephone devices. Such mobile IoT devices may serve as portable nodes in IoT networks that facilitate data collection and device connectivity within a broader environment than traditional internet infrastructure. To improve deployment of mobile IoT devices as nodes in IoT networks, users may be sent activities via their smartphones through which completion of the activities or performance of activity parameters facilitates using the smartphones as IoT network nodes. Additionally or alternatively, activity completion or performance of activity parameters may contribute to one or more other objectives that may or may not be related to IoT network connectivity and operability.

Aspects of the present disclosure may determining the relevance of one or more activities to a particular user or a particular IoT device of the particular user. In some aspects, information provided by an IoT device or a user may be used to identify relevant activities that may be sent to the user via the IoT device. In some implementations, a crowd-sourced method may send data relating to identifying the activities from the IoT device to a server without relying on a fixed or centralized infrastructure. Another implementation may include a crowd-sourcing method for a cloud server to send data about the identified activities to the IoT device without relying on a fixed or centralized infrastructure. A further implementation may include a method for routing data (e.g., beacons and/or data packets) from multiple services on multiple IoT devices to the appropriate device manufacturer servers. As such, aspects of the present disclosure may improve the assignment and relevancy of activities sent to users via their smartphones or other IoT devices.

Furthermore, another problem with the activities sent to users may be that completion of the activities may be fabricated by the user. Consequently, there may be a need for activities-completion verification to prevent fake activity completions. Aspects of the present disclosure may address this problem by providing an activity-completion verification process based on one or more network nodes included in the IoT network. In some implementations, information provided by an IoT device or a user may be compared with information provided by other IoT devices or users that are included as part of the same IoT network to verify activity completion. As such, aspects of the present disclosure may improve activity-completion verification based on information sent to and provided by IoT networks.

Implementations of the present disclosure are explained with reference to the accompanying figures. Some of the activities may be described herein with respect to a non-limiting example activity which may be referred to as a "mission" or "missions."

FIG. 1A illustrates an example IoT network architecture 100 in accordance with some implementations of this disclosure. The IoT network architecture 100 may include one or more endpoint devices 105 (e.g., first endpoint device 105a, second endpoint device 105b, third endpoint device 105c, fourth endpoint device 105d), one or more intermediate devices 115 (e.g., first intermediate device 115a, second intermediate device 115b, third intermediate device 115c, fourth intermediate device 115d), one or more super nodes 125 (e.g., super node 125a, super node 125b), and one or more destination nodes 135. In some implementations, the IoT network architecture 100 may be configured to move data between one or more endpoint devices 105 and various destination nodes 135 by way of one or more crowd-sourced intermediate devices 115, which may function as network clients, and the super nodes 125.

The endpoint device 105 may include one or more IoT devices. The endpoint device 105 may include a power supply, a data collection device (e.g., location collection sensor, image collection sensor, sound collection sensor, air quality collection sensor), and a network device. The power supply may include a battery or a connection to a power grid. Additionally, or alternatively, the power supply may include an energy harvesting apparatus, such as a solar panel, solar cell, solar photovoltaic cell, electromagnet, etc. In some implementations, the endpoint device 105 may not include a power supply and may instead use ambient backscatter techniques. The endpoint device 105 may also include one or more sensors. The sensors may be configured to detect any type of condition, and generate electronic data based on a detected condition.

For example, the endpoint device 105 may include a smart watch with a heart rate sensor that is configured to generate heart rate data using heart rate conditions collected by the heart rate sensor. In some implementations, the endpoint device 105 does not have capability to communicate over the internet and only includes hardware and/or software capable of communicating with nearby devices, such as a nearby intermediate device 115.

The network device of the endpoint device 105 may include any hardware, software, or combination thereof that is capable to communicate with another device via a network. In some implementations, the network device may include any network controller configured to communicate via a short-range network, such as Bluetooth® or any other short-range network. In some implementations, the network device may include any network controller configured to communicate via any network of any range. In some implementations, the network device may include any network controller configured to communicate via a low-power network. Example endpoint devices 105 include, but are not limited to, industrial devices, residential appliances, commercial equipment, inventory trackers, smart watches, wearables, heart rate monitors, logistics trackers, environmental sensors, cash registers, credit card readers, point-of-sale (POS), bikes, electric scooters, electric skateboards, cars, electric cars, satellites, a Bluetooth® tag, Bluetooth® sticker, smartphones, or any device (mobile and not mobile that includes a wireless radio interface). The IoT network architecture 100 may include any number of endpoint devices 105 and the endpoint devices 105 in the network architecture 100 may be any type of endpoint device 105, including any type of network-capable device. The endpoint devices 105 may be fixed or relatively stationary in the IoT network architecture 100, such as a POS or a pollution sensor. Additionally, or alternatively, the endpoint devices 105 may be mobile, such as a smart watch, a smartphone, or any car or vehicle.

The one or more endpoint devices 105 may be configured to communicate with other devices via at least one wireless network 110 (e.g., network 110a, network 110b, network 110c, network 110d). For example, a first endpoint device 105a may be in electronic communication with a first intermediate device 115a via a wireless network 110a. The one or more intermediate devices 115 may include any type of device capable of communicating with an endpoint device 105 via the wireless network 110 and with a super node 125 via the wireless network 110 and/or via a second network 120. In some implementations, an intermediate device 115 may include two network controllers—a first network controller to communicate via the wireless network 110 and a second network controller to communicate via the second network 120. Example intermediate devices 115 include personal computers (PC), laptops, smart phones, netbooks, e-readers, personal digital assistants (PDA), cellular phones, mobile phones, tablets, vehicles, drones, cars, trucks, wearable devices, routers, televisions, or set top boxes, etc.

As illustrated, the first endpoint device 105a may be in electronic communication with the first intermediate device 115a via the wireless network 110a (e.g., a short-range network). Further, a second endpoint device 105b may be in electronic communication with a second intermediate device 115b via another wireless network 110b (e.g., a low-power network). A third endpoint device 105c may be in electronic communication with a third intermediate device 115c via another wireless network 110c. A fourth endpoint device 105d may be in electronic communication with a fourth intermediate device 115d via another wireless network 110d.

In some implementations, the wireless network 110 may be any network that uses a relatively low amount of power. Example wireless networks 110 may include any Bluetooth® network type (e.g., Bluetooth Low Energy (BLE), Bluetooth 4.0, Bluetooth 5.0, Bluetooth Long Range), Narrowband-IoT, Long Term Evolution (LTE) Direct, LTE-M, LTE Machine to Machine (M2M), 5G, Wi-Fi, Wi-Fi Aware, data-over-sound, QR code, or any network. The one or more endpoint devices 105 may connect to various intermediate devices 115 using different types of wireless networks 110. For example, the first endpoint device 105a may be in electronic communication with the first intermediate device 115a via a first short-range wireless network 110a and the second endpoint device 105b may be in electronic communication with the second intermediate device 115b via a second short-range wireless network 110b.

Endpoint devices 105, intermediate devices 115, or both, may be fixed, relatively stationary or moveable. When an endpoint device 105 and an intermediate device 115 come into wireless range of each other, the endpoint device 105 and the intermediate device 115 may perform a handshake and/or authentication to initiate data exchange between the endpoint device 105 and the intermediate device 115.

In some implementations, the endpoint device 105 may periodically send data (e.g., a beacon and/or a data packet) via the wireless network 110. The endpoint devices 105 may include various services that may run on the endpoint devices 105. For example, a smart watch may include a clock service, a heart rate monitor service, a motion detection service, a music service, etc. As another example, a smartphone may include one or more software applications relating to health services, social media services, music services, etc. Beacons or data packets may be generated for each of these services or a single beacon or data packet may be generated to include data for some or all of the services.

An intermediate device 115 may listen for such data from endpoint devices 105. Responsive to receiving data, the intermediate device 115 may send the data to a super node 125 via a network, such as the second network 120. In some implementations, the wireless network 110 and the second network 120 are different types of networks. For example, the wireless network 110 may be a Bluetooth® network and the second network 120 may be a cellular network, Wi-Fi, or the Internet. In some implementations, the intermediate device 115 may use a directory to locate the super node 125. Additionally, or alternatively, the intermediate device 115 may identify more than one super node 125 and may select one of the super nodes 125 in which to send the data. The intermediate device 115 may select the super node 125 based on proximity, latency, or any other factor. The second network 120 may include a public network (e.g., the Internet), a private network (e.g., a local area network (LAN) or wide area network (WAN), a wired network (e.g., Ethernet network), a wireless network (e.g., an 802.xx network or a Wi-Fi network), a cellular network (e.g., a Long Term Evolution (LTE) or LTE-Advanced network, 1G, 2G, 3G, 4G, 5G, etc.), routers, hubs, switches, server computers, and/or a combination thereof.

The one or more super nodes 125 may include one or more computing devices, such as a rackmount server, a router computer, a server computer, a personal computer, a mainframe computer, a laptop computer, a tablet computer, a desktop computer, a smartphone, a car, a drone, a robot, a vehicle, or any mobility device that has an operating system, etc.), data stores (e.g., hard disks, memories, databases), networks, software components, and/or hardware components.

The one or more super nodes 125 may perform functions related to one or more of data routing, activity validation, storage, and insight management. These particular functions are described in further detail in conjunction with FIG. 2. For example, the super node 125a may validate activities performed by the intermediate devices 115a and 115b. The super node 125b may validate activities performed by the intermediate devices 115c and 115d. In some implementations, any super node 125 may validate activities of any intermediate device 115.

Figure 1B:
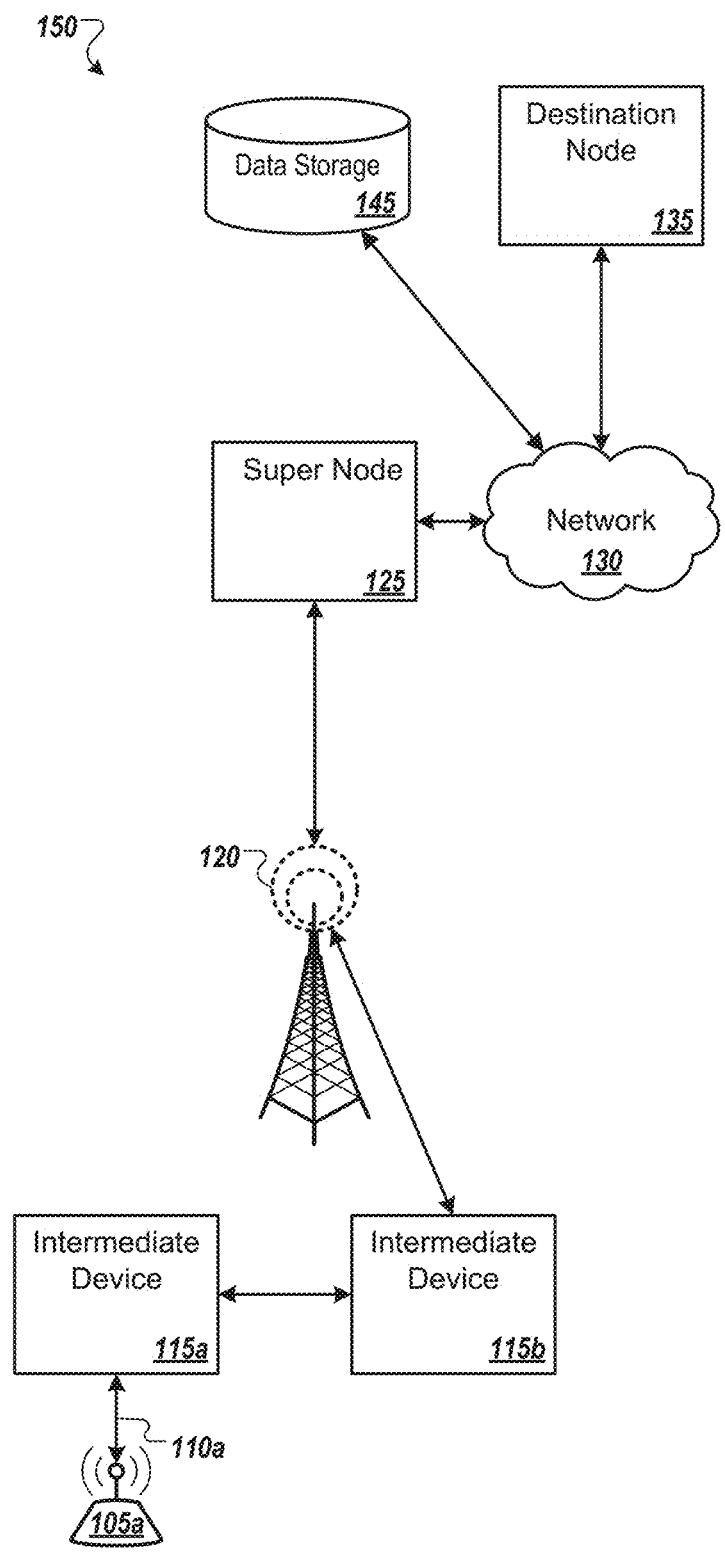
FIG. 1B illustrates an another example network architecture in accordance with some implementations of this disclosure.

The super node 125 may include or be coupled to a data storage 145. The data storage 145 may include any memory or data storage. In some implementations, the data storage 145 uses the InterPlanetary File System (IPFS). In some implementations, the data storage 145 may include computer-readable storage media for carrying or having computer-executable instructions or data structures stored thereon. The computer-readable storage media may include any available media that may be accessed by a general-purpose or special-purpose computer, such as a processor. For example, the data storage 145 may include computer-readable storage media that may be tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and that may be accessed by a general-purpose or special-purpose computer. Combinations of the above may be included in the data storage 145. In some implementations, as shown in FIG. 1B, the data storage 145 is separate from the super node 125 and is accessible via a network 130. In some implementations, as shown in FIG. 1A, the data storage 145 may be part of the super node 125. In some implementations, the data storage 145 may include multiple data storages. The data storage 145 may include routing data, validation data, storage data, and insight data, as further described in conjunction with FIG. 2.

The one or more super nodes 125 may be configured to receive data from the intermediate device 115. The one or more super nodes 125 may send the data (or other information related to or associated with the received data) to a destination node 135.

The one or more super nodes 125 may send the data, or other information related to the data, to a destination node 135 via a third network 130. The third network 130 may include a public network (e.g., the Internet), a private network (e.g., a local area network (LAN) or a wide area network (WAN)), a wired network (e.g., Ethernet network), a wireless network (e.g., an 802.xx network or a Wi-Fi network), a cellular network (e.g., a Long Term Evolution (LTE) or LTE-Advanced network, 1G, 2G, 3G, 4G, 5G, etc.), routers, hubs, switches, server computers, and/or a combination thereof. In some implementations, the second network 120 and the third network 130 are the same network or include at least some overlapping components. In some implementations, the first network 110, the second network 120, and the third network 130 are part of the same network or include at least some overlapping components.

The destination node 135 may include one or more computing devices, such as a rackmount server, a router computer, a server computer, a personal computer, a mainframe computer, a laptop computer, a tablet computer, a desktop computer, a smartphone, a car, a drone, a robot, or any mobility device that has an operating system etc.), data stores (e.g., hard disks, memories, databases), networks, software components, and/or hardware components. The destination node 135 may be associated with one or more endpoint devices 105. For example, an entity may sell or purchase an endpoint device 105 and may use the destination node 135 to communicate with and/or control the endpoint device 105. In some implementations, the destination node 135 and at least one of the endpoint devices 105 are manufactured and/or sold by different entities.

The destination node 135 may send one or more messages to a particular endpoint device 105, or a set of endpoint devices 105. For example, the destination node 135 may send updates (e.g., firmware, software) to the particular endpoint device 105, or the set of endpoint devices 105. The destination node 135 may send other communications to an endpoint device 105, such as a response to a request from a beacon generated by the particular endpoint device 105, or any other type of communication.

In some implementations, the one or more super nodes 125 may receive a message from the destination node 135 and, in some implementations, the one or more super nodes 125 may send the message from the destination node 135 to an intermediate device 115. In some implementations, the intermediate device 115 may perform one or more operations responsive to receiving the message from the destination node 135. The operations may include operations local to the intermediate device 115, and/or sending the message from the destination node 135 to an endpoint device 105.

Modifications, additions, or omissions may be made to the network architecture 100 without departing from the scope of the present disclosure. The present disclosure more generally applies to the network architecture 100 including one or more endpoint devices 105, one or more wireless networks 110, one or more intermediate devices 115, one or more second networks 120, one or more super nodes 125, one or more third networks 130, and one or more destination nodes 135 or any combination thereof.

Moreover, the separation of various components in the implementations described herein is not meant to indicate that the separation occurs in all implementations. In addition, it may be understood with the benefit of this disclosure that the described components may be integrated together in a single component or separated into multiple components.

FIG. 1B illustrates an example network architecture 150 in accordance with some implementations of this disclosure. The network architecture 150 may include components illustrated and described in FIG. 1A, such one or more endpoint devices 105, one or more intermediate devices 115, one or more super nodes 125, one or more destination nodes 135, and one or more data storages 145.

In some implementations, the one or more super nodes 125 may receive a message from the destination node 135 and, in some implementations, the one or more super nodes 125 may send the message from the destination node 135 to an intermediate device 115b. In some implementations, the intermediate device 115b may perform one or more operations responsive to receiving the message from the destination node 135. The operations may include operations local to the intermediate device 115b, and/or sending the message from the destination node 135 to another intermediate device 115a. Any number of intermediate devices 115 may be implemented and may be configured in a mesh network. The intermediate device 115a may perform one or more operations responsive to receiving the message from the intermediate device 115b, such as operations local to the intermediate device 115a, and/or sending the message from the destination node 135 to an endpoint device 105a via network 110a.

The endpoint device 105a may also send a message to the intermediate device 115a. Rather than directly sending the message to the super node 125 via network 120, the intermediate device 115a may send the message to any number of intermediate devices 115. As illustrated, the intermediate device 115a may send the message to the intermediate device 115b, but any number of intermediate devices may be used to ultimately route the message to the super node 125. In some implementations, the intermediate device 115a may select another intermediate device 115 when the intermediate device 115 is closer in proximity to the intermediate device 115a as compared to the super node 125. Any factor may be used by the intermediate device 115a to decide where to send the message, including a latency between the intermediate device 115a and the super node 125, a latency between the intermediate device 115a and another intermediate device 115b, etc. The super node 125 may send the message to the destination node 135 via the network 130.

Figure 2:
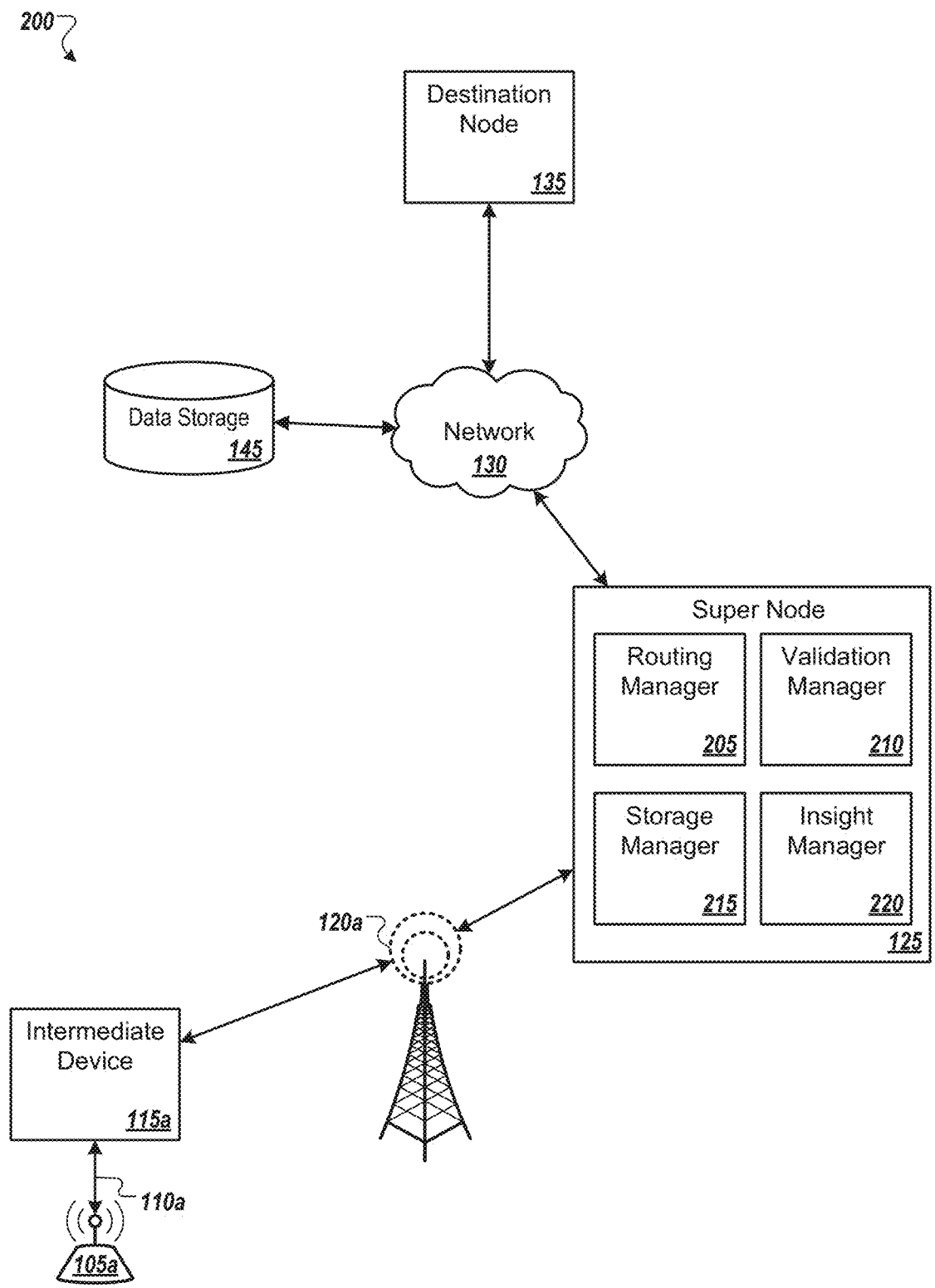
FIG. 2 illustrates another example network architecture in accordance with some implementations of this disclosure.

FIG. 2 illustrates another example network architecture 200 in accordance with some implementations of this disclosure. The network architecture 200 may include components illustrated and described in FIG. 1A or 1, such one or more endpoint devices 105, one or more intermediate devices 115, one or more super nodes 125, one or more destination nodes 135, and one or more data storages 145.

The data storage 145 may include various data that may be used by the super node 125. For example, the data storage 145 may include routing data that may be used for routing data packets, validation data that may be used to validate activities of the intermediate device 115, storage data for storing various data received by the super node 125, and insight data that may be used to generate information and statistics related to the system 200 and operations performed therein.

In particular, FIG. 2 illustrates a super node 125 that may perform routing, validation, storage, and insight operations. For example, the super node 125 may validate activities of the intermediate device 115. The super node 125 may include one or more of a routing manager 205, a validation manager 210, a storage manager 215, and/or an insight manager 220.

The routing manager 205, the validation manager 210, the storage manager 215, and/or the insight manager 220 each may be implemented using hardware including a processor, a microprocessor (e.g., to perform or control performance of one or more operations), an FPGA, or an ASIC. In some other instances, the routing manager 205 may be implemented using a combination of hardware and software. Implementation in software may include rapid activation and deactivation of one or more transistors or transistor elements such as may be included in hardware of a computing system (e.g., the super node 125). Additionally, software defined instructions may operate on information within transistor elements. Implementation of software instructions may at least temporarily reconfigure electronic pathways and transform computing hardware.

The routing manager 205 may route data pertaining to the endpoint devices 105, intermediate devices 115, and destination nodes 135. To route the data, the routing manager 205 may track and/or access relationships between the endpoint devices 105, intermediate devices 115, and destination nodes 135. For example, the routing manager 205 may access, in the data storage 145, routing data, such as a routing table or list of endpoint devices that are associated with a particular destination node 135.

The routing manager 205 may process communications between the endpoint device 105, the intermediate device 115 and the destination node 135. In an example, the routing manager 205 may receive data (e.g., a beacon and/or a data packet) from the intermediate device 115 via the second network 120. The data may have been sent to the intermediate device 115 via the wireless network 110 by endpoint device 105. The data may contain characteristics about the endpoint device 105, including an identifier of the endpoint device 105 (e.g., a MAC address, a unique ID), a geographical location of the endpoint device 105, and advertisements of the UUIDs of the services it supports, etc. The routing manager 205 may identify the characteristic of the endpoint device 105, such as by analyzing the data to identify information pertaining to the endpoint device 105. The routing manager 205 may access the data storage 145 to identify, based on the characteristic of the endpoint device 105 in the data, a destination node 135 that is associated with the endpoint device 105 and/or the data. For example, the identifier of the endpoint device 105 may be associated with a particular manufacturer that operates a particular destination node 135. The routing manager 205 may identify this particular destination node 135 in the data storage 145 and an address and/or path to send the data in order to reach the destination node 135. In some implementations, the routing manager 205 may send the data, or a beacon, or a data packet to the destination node 135 via the third network 130. The data may include a beacon, may not include a beacon, or may include information pertaining to the beacon and endpoint device 105.

In some implementations, the data may include information and/or data from multiple services associated with the endpoint device 105. Additionally, or alternatively, multiple beacons or data packets from a single endpoint device 105 may be generated and broadcast via the wireless network 110. Each of these multiple beacons or data packets, for example, may be associated with a different service associated with the endpoint device 105. The routing manager 205 may identify the services, and based on information for the service, identify an appropriate destination node 135 that should receive the data.

The validation manager 210 may validate activities that are performed in the system 200. Because the super node 125 is not typically directly connected to the endpoint device 105, the super node 125 does not necessarily know whether the data actually came from the endpoint device 105. Simply trusting data from intermediate devices, the validation manager 210 may verify that the intermediate device sent accurate and actual data from the endpoint device 105. For example, the validation manager 210 may verify whether the intermediate device 115 actually processed data received from the endpoint device 105.

In some implementations, the validation manager 210 may also attribute a reward for the intermediate device 115 for activities performed within the system 200. For example, the validation manager 210 may allocate cryptocurrency to the intermediate device 115 (or to an account associated with the intermediate device 115). To reduce the likelihood of rewarding a device that did not actually perform a particular activity, the validation manager 210 can validate the activity that was purportedly performed by the intermediate device 115 prior to allocating a reward.

In some implementations, responsive to receiving data, the intermediate device 115 may send the data, along with metadata, to the super node 125. The validation manager 210 may identify the metadata and may use the metadata to verify activities of the intermediate device 115. The metadata may, for example, be additional information added to, or sent with, the data to the super node 125. The metadata may include data pertaining to data received from endpoint devices, such as a timestamp of the receipt of the data by the intermediate device 115, a timestamp associated with the creation of the data (e.g., beacon and/or data packet) by the endpoint device, a timestamp of the transmission of the data by the intermediate device 115 to the super node 125, a geolocation associated with the data and/or the endpoint device 105 that created or transmitted the data, sensor data associated with the endpoint device, a geolocation associated with the intermediate device 115, the type of network used to communicate the data from the endpoint to the intermediate device 115, an amount of data received by the endpoint device 105, an amount of data sent by the intermediate device 115, an amount of data received by the super node 125, endpoint device density, intermediate device density, latency, local sensors data from the intermediate device, etc. The metadata may be stored as validation data in the data storage 145.

To validate the activity of the intermediate device 115, the validation manager 210 may extract the metadata from the communication that the super node 125 received from the intermediate device 115. For example, the validation manager 210 may extract one or more timestamps associated with the data. The validation manager 210, may for example, extract the timestamp of the receipt of the data by the intermediate device 115, the timestamp associated with the creation of the data by the endpoint device 105, the timestamp of the transmission of the data by the intermediate device 115 to the super node 125, and may also determine a timestamp for when the super node 125 received the data.

The validation manager 210 may compare at least some of these timestamps to ensure that they make sense. For example, the validation manager 210 may check to see whether the timestamp chronology matches the expected route of the data. The timestamp of the data creation, for example, should precede any other timestamp and the receipt of the data at the super node 125 should follow any other timestamp. In some implementations, when the validation manager 210 determines that timestamps chronologically fit the expected travel path, the validation manager 210 may determine that the intermediate device 115 did in fact receive the data from the endpoint device 105. The validation manager 210 may then attribute a reward to the intermediate device 115 for performing such activity.

In some implementations, the validation manager 210 may validate the activity of the intermediate device 115 using two or more timestamps. The validation manager 210 may identify a timestamp associated with the data received from the intermediate device 115. To validate the activity, the validation manager 210 may identify different data with different timestamps. For example, the validation manager 210 may identify different data from the intermediate device 115. Additionally or alternatively, the validation manager 210 may identify different data from different intermediate devices 115 that are within a predetermined geographical region. The validation manager 210 may compare the different timestamps with the timestamp associated with the data. The validation manager 210 may determine that the different timestamps with the timestamp associated with the data are within a similarity threshold. For example, the validation manager 210 may determine that the timestamp chronology for the different timestamps with the timestamp associated with the data matches an expected route and timing of the data. The validation manager 210 may validate the activity of the intermediate device 115 based on the determination that determining that the extracted timestamps with the timestamp associated with the data are within the similarity threshold.

Other validation schemes are myriad. For example, the validation manager 210 may use any or all, or any combination, of the metadata as part of the validation. The validation manager 210 may, for example, determine, such as through the metadata, that the endpoint device 105 used a short-range network to send the data to the intermediate device 115. Knowing this, the validation manager 210 may then compare the geo-location of the endpoint device 105 and the intermediate device 115 for similarity, since short-range communication was used between the endpoint device 105 and the intermediate device 115. Responsive to a determination that the geolocation of the endpoint device 105 and the geolocation of the intermediate device 115 are within a threshold range, the validation manager 210 may determine that the intermediate device 115 did in fact receive the data from the endpoint device 105.

In some implementations, metadata from multiple intermediate devices 115 may be used to perform validation. In some implementations, validation managers 210 on multiple intermediate devices 115 may function as a cluster of validation nodes. For example, multiple intermediate devices 115 that are close in proximity to each other (e.g., in a same room, in a same building, nearby outside, etc.) may receive similar information from multiple connected devices. In some implementations, the multiple intermediate devices 115 may each receive a similar set of data from a nearby endpoint device 105. To the extent that the multiple intermediate devices 115 are not in the exact same location, the multiple intermediate devices 115 may not receive exactly the same data as each other but may receive at least a few of the same data (e.g., beacons, data packets). To validate a particular activity of a particular endpoint device 105, the validation manager 210 may query the validation data in the data storage 145 to determine whether any other received metadata is similar to the metadata associated with the particular intermediate device 115. For example, the validation manager 210 may identify a geolocation of the particular intermediate device 115 and may search the validation data in the data storage 145 for similar geolocations. Responsive to identifying a similar geolocation associated with any of the intermediate devices 115, the validation manager 210 may inspect any data associated with the intermediate devices 115 to determine similarity with data associated with the particular intermediate device 115. For example, the validation manager 210 may determine that the data received from the particular intermediate device 115 included a payload. The validation manager 210 may determine whether the other intermediate devices 115 also sent the payload to the super node 125. Responsive to a determination that the other intermediate devices 115 also sent the payload to the super node 125, the validation manager 210 may validate the activity of the particular intermediate device 115.

Similar to the above example, instead of or in addition to comparing payloads, the validation manager 210 may determine whether the intermediate devices 115 received two or more beacons or data packets that were also received by the particular endpoint device 105 as part of the validation. Responsive to a determination that the intermediate devices 115 received two or more beacons or data packets that were also received by the particular intermediate device 115, the validation manager 210 may validate the activity of the particular intermediate device 115.

Similar to the above examples, the validation manager 210 may determine whether two or more intermediate devices received the data (or more than one of the same beacons or data packets) that were also received by the particular intermediate device 115 as part of the validation. Responsive to a determination that two or more intermediate devices received the data (or more than one of the same beacons or data packets) that were sent by the particular intermediate device 115, the validation manager 210 may validate the activity of the particular intermediate device 115.

Moreover, the validation manager 210 may also inspect for completeness of data for similarly located intermediate devices. For example, the validation manager 210 may determine that a set of intermediate devices send substantially similar data to the super node 125 and an outlier intermediate device (that has a geolocation that is a similar geolocation as the set of intermediate devices) sends incomplete data to the super node 125, as compared to data received by the super node 125 by the set of intermediate devices.

In some implementations, to validate an activity, the validation manager 210 may inspect the payload and compare it to other received payloads. Responsive to determining that the payload has been received more than a threshold number of times, the validation manager 210 may decline to validate the activity because the sending intermediate device 115 may be sending inaccurate data in an effort to fraudulently receive a reward.

Further, the validation manager 210 may compare types of endpoint devices 105 as part of the validation. For example, the super node 125 may receive data from multiple intermediate devices 115 that indicate that multiple intermediate devices 115 are in communication with a sensor, a television, a set-top box, a connected skateboard, a smart watch, and a laptop. An outlier intermediate device with a similar geolocation as the multiple intermediate devices 115 indicates communication with the sensor, television, set-top box, connected skateboard, smart watch, and laptop, but the outlier intermediate device also indicates communication (such as by forwarding beacons or data packets) from additional devices. Responsive to determining that the multiple intermediate devices 115 each communicate with similar devices and that the outlier intermediate device also communicates with the additional devices, the validation manager 210 may determine that the outlier intermediate device is not sending true and accurate data to the super node 125. In response, the validation manager 210 may refrain from rewarding the outlier intermediate device, even for legitimate beacons or data packets because the outlier intermediate device appears to be attempting to trick the validation manager 210 into granting rewards for activities not actually performed by the outlier intermediate device. In some implementations, the validation manager 210 may also cause a disconnection of the outlier intermediate device with the system 200. For example, the validation manager 210 may add the outlier intermediate device (or an identifier of the outlier intermediate device) to a blacklist. The blacklist may be used by the super node 125, or by any other component of the system 200, to refuse or block communications with the outlier intermediate device.

In some implementations, multiple validation managers 210 may be used to validate activities based on a consensus between the multiple validation managers 210. In some implementations, the multiple validation managers 210 may have a 100% consensus for validation. Alternatively, the multiple validation managers 210 may have less than a 100% consensus for validation, provided that the consensus is above a threshold consensus amount.

Additionally or alternatively, the validation manager 210 may use data mining, deep learning, artificial intelligence, cryptographic signatures in order to provide a more robust verification scheme and determine whether data is valid. For example, data mining could be used to estimate the expected route of a single IoT device 105 or intermediate device 115 so as to automatically compute a score of confidence on the trustability of an intermediate device by measuring the deviation between the received metadata sent by the intermediate device and the expected path.

Responsive to a successful validation of an activity, the validation manager 210 may attribute a reward for the activity to the intermediate device 115, or to an account associated with the intermediate device 115. Example rewards may include cryptocurrency, a title, a status, an upgrade, credits, etc.

Rewards may be different for different activities. Different data may have different values. For example, relaying a relatively small piece of data may be associated with a smaller reward than a larger reward for relaying a relatively larger piece of data. Additionally, or alternatively, an entity may adjust the reward for certain types of activities. For example, a particular entity may desire to collect data in a highly concentrated area and at a particular time (e.g., at a sports game). The entity may assign a bounty for validated data that are received from near the area and during the particular time. The validation manager 210 may attribute this bounty for activities that meet the criteria of the bounty that was set by the entity. In at least one implementation, data collected in a first region may have a different value (e.g., higher or lower) than data collected in a second region.

In some implementations, the super node 125 may receive the same data from two different intermediate devices 115 and the validation manager 210 may validate the activities of both of the different intermediate devices 115. The validation manager 210 may, in some implementations such as where the reward is a capped maximum reward, split or share the reward with the two different intermediate device 115. The split or share may be equal or unequal. For unequal splits or shares, the validation manager 210 may take into account any of the metadata. For example, the validation manager 210 may determine a first latency associated with a first intermediate device 115 in relaying the data, and a second latency associated with a second intermediate device 115 in relaying the data. The validation manager 210 may split the reward based on the latency. Any other metadata, or any other data may be used to split or share the reward with the any number of different intermediate devices 115. Additionally, or alternatively, the validation manager 210 select one of the two different intermediate device 115 to receive the whole of the reward. Similarly, the validation manager 210 may use any data to select one of the two different intermediate devices 115 to receive the whole of the reward. Similar to the example above, the validation manager 210 may select the first intermediate device 115 when the first latency associated with the first intermediate device 115 in relaying the data is shorter (e.g., faster) than the second latency associated with the second intermediate device 115.

In some implementations, such as in an environment that includes a mesh network, a single intermediate device 115 may not alone relay data to the super node 125. Instead, multiple intermediate devices 115 may relay the data through a mesh network until the exit intermediate device sends the data to the super node 125. The reward, for example, may be divided among each of the intermediate devices that helped to relay the data to the super node 125. In some implementations, the exit intermediate device may be afforded a higher portion of the reward for its role as the exit intermediary device. In some implementations, the exit intermediate device may be afforded the entire reward for its role as the exit intermediary device.

The validation manager 210 may create a record of activities and contributions, on both an individualized and aggregate basis. For example, the validation manager 210 may create a record of activities and contributions associated with a particular user account (which may be associated with more than one intermediate device 115). In some implementations, the validation manager 210 may create the record of activities and contributions in a hashed tree data structure and store the hash in the data storage 145 (e.g., the IPFS). In some implementations, the validation manager 210 may write the hash, or a portion of the hash to a cryptocurrency transaction and/or to a blockchain.

In some implementations, data received from intermediate devices may not be sent to a destination node 135. The storage manager 215 may cause the data to be stored and indexed for later retrieval for validation, or for other purposes.

The insight manager 220 may generate various statistics and reports based on all data that touches a super node 125. For example, the insight manager 220 may identify how many activities are validated by a particular validation manager 210.

The network architecture 100 may be used to exchange any volume of data between any devices capable of network-based communication in a manner that is different than conventional communication over the Internet.

In an example, the network architecture 100 may leverage existing smartphone infrastructure to create connectivity that is alternative to conventional internet communication. In some implementations, the network architecture 100 can move data to the cloud in an initially delay tolerant fashion, which may be useful for many types of IoT communications such as firmware updates, status updates, log-file storage, and micropayments. The intermediate device may include software that runs on smartphones to periodically scan for other devices (e.g., the endpoint devices 105) like industrial devices, smartwatches, wearables, logistics trackers, and environmental sensors. These endpoint devices 105 may connect with the software client running on the smartphones to create massive, area wide networks for moving data to and within the cloud. The present disclosure may be used to validate communications over this new network.

Further, it has been estimated that 95% of the human population is covered by some sort of cellular service. The network architecture 100 can be deployed anywhere in the world and enables regions of lower connectivity to increase their connectivity. Moreover, the network architecture 100 can provide coverage beyond the reach of conventional cellular networks by using software that runs on Bluetooth®-enabled smartphones, for example. Users may travel to areas of limited or no cellular connectivity, but still may receive data from endpoint devices 105 via the wireless network 110. Using the network architecture 100, telco operators, for example, can now easily deploy a software update to their user devices to begin communicating with endpoint devices 105 as described herein to provide higher latency IoT connectivity to even the remotest regions of the world.

In a specific example, the network architecture 100 can be used for asset tracking and management. For example, the network architecture 100 can be used to find lost items that are configured as an endpoint device 105, such as a skateboard with a wireless radio chipset, an attached tracking beacon, a Bluetooth tag or sticker, a laptop, etc. A user, for example, may indicate that the item is lost, such as by using a mobile application or website to indicate, to the destination node 135 or to the super node 125, that the item is lost. In a first implementation, the destination node 135 may send a message to one or more super nodes 125 to watch for the lost item. The super nodes 125 may add an identifier of the lost item to a lost item watch list. As intermediate devices 115 move to different geographic locations, they can receive data from different endpoint devices 105. The intermediate devices 115 then forward the data to the super nodes 125. When a super node 125 server receives data, the super node 125 can analyze the data to validate whether the data originated at an endpoint device 105 that is on the watch list. When the super node 125 identifies data that originated at an endpoint device 105 that is on the watch list, the super node 125 can notify the destination node 135 that the lost item has been found. In some implementations, the super node 125 may send the notification that the lost item has been found as a push notification or as a pull notification (i.e., in response to a request from the destination node 135). In some implementations, the super node 125 may send the notification that the lost item has been found to the user device that was used by the user to indicate that the item was lost.

Modifications, additions, or omissions may be made to the network architecture 200 without departing from the scope of the present disclosure. The present disclosure more generally applies to the network architecture 200 including one or more endpoint devices 105, one or more wireless networks, one or more intermediate devices 115, one or more second networks 120, one or more super nodes 125, one or more third networks 130, and one or more destination nodes 135 or any combination thereof.

Moreover, the separation of various components in the implementations described herein is not meant to indicate that the separation occurs in all implementations. In addition, it may be understood with the benefit of this disclosure that the described components may be integrated together in a single component or separated into multiple components. The opposite may also apply; for example, as illustrated in FIG. 2, the routing manager 205, validation manager 210, storage manager 215, and insight manager 220 are all part of a single super node 125. A super node 125, however, may include all or fewer than all of these managers. For example, a super node 125 dedicated to routing may only include the routing manager. Similarly, a super node 125 dedicated to validation may only include the validation manager 210. In such instances, the various managers may still communicate with each other, such as via a network. Moreover, any of the routing manager 205, validation manager 210, storage manager 215, and insight manager 220 may be part of, or execute on, any device. For example, an intermediate device 115 may also include a validation manager 210 that may validate activities of the intermediate device 115, as well as other intermediate devices. In such implementations, the validation manager 210 may be physically or logically separated from other portions of the intermediate device 115, so as to preserve the integrity of the validation manager 210.

Figure 3:
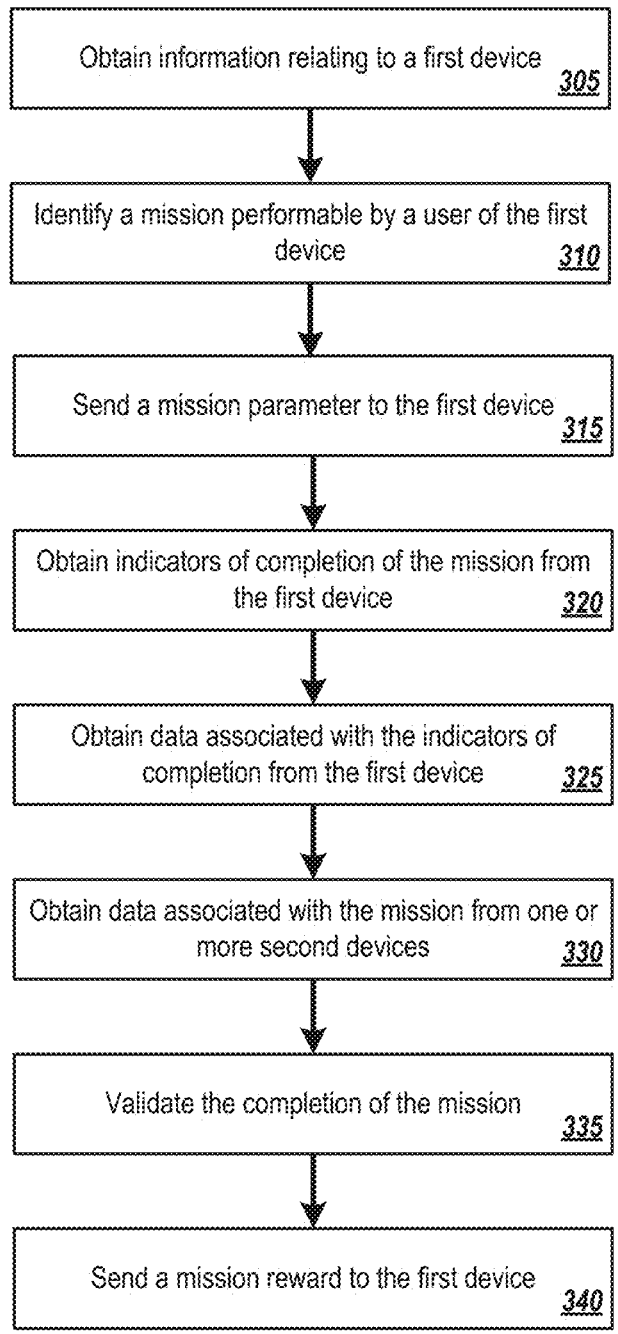
FIG. 3 illustrates a flow diagram of an example method related to assignment and completion validation of an activity in accordance with some implementations of this disclosure.

FIG. 3 illustrates a flow diagram of an example method 300 related to assignment and completion validation of a mission. The method 300 may be performed by any suitable system, apparatus, or device. For example, the endpoint devices 105, the intermediate devices 115, the super node 125, and/or the validation manager 210 may perform one or more operations associated with the method 300. Although illustrated with discrete blocks, the steps and operations associated with one or more of the blocks of the method 300 may be divided into additional blocks, combined into fewer blocks, or eliminated, depending on the particular implementation.

The method 300 may begin at block 305 where a destination node may obtain information relating to a first device. The first device may include any intermediate device or endpoint device, such as the intermediate devices 115 or the endpoint devices 105, respectively, described in relation to FIGS. 1A, 1, and 2. In some implementations, the destination node may include another intermediate device or endpoint device, such as a server with which the first device is communicating and to which the first device sends information. For example, the first device may send geolocation information, clock information, and software application usage information to the destination node via a software application associated with the destination node. In some implementations, the information relating to the first device may be sent at periodic intervals, in response to specific actions or commands (e.g., hitting a "send information" button in the software application associated with the destination node), upon initially communicating with the destination node, or according to any other prompts.

At block 310, the destination node may identify a mission performable by a user of the first device based on the obtained information about the first device. The destination node may include a list of missions in which each mission on the list of missions includes one or more mission-relevance criteria. Each of the mission-relevance criteria may include a criterion relating to the information obtained from the first device that determine whether the mission corresponding to the mission-relevance criteria is applicable to the first device. For example, a particular mission may include a mission-relevance criterion relating to the geolocation of the first device; the particular mission may only be relevant to the first device if the first device is located within a set distance from a target location. As another example, a particular mission may be relevant to users of the first device who have used a particular software application, so a corresponding mission-relevance criterion may include determining whether the first device information includes usage data related to the particular software application.

At block 315, the destination node may send one or more mission parameters to the first device. In some implementations, the mission parameters may determine one or more ways for the user of the first device to successfully perform a mission associated with the mission parameters. The mission may include affirmative actions that the user of the first device may perform that are detectable from information provided by the first device, such as scanning a QR code, passing by one or more locations (within a particular period of time or in a particular sequence), downloading a particular software application, going to a particular location for a particular period of time or within a particular window of time, etc. Additionally or alternatively, the mission may include actions that the user of the first device may perform that are detectable based on information provided by another device in communication with the same network as the first device. For example, such missions may include performing a particular action on a particular software application in which the particular software application is also in communication with the same network and may send information affirming that the particular action was performed by the first device or by the user of the first device. As additional or alternative examples, the missions may include visiting a particular website via the first device (which may be verified by a web server corresponding to the particular website), viewing an advertisement for a particular period of time, using a software application for a particular period of time, taking an electronic survey, sharing content over social media (which may be verified by one or more nodes related to the social media site), etc.

At block 320, the destination node may obtain one or more indicators of mission completion from the first device. The indicators of mission completion may include any information provided by the first device that relate to first device or the user of the first device satisfying the mission parameters previously sent by the destination node. Returning to the example of going to a particular location for a particular period of time or within a particular window of time, the first device may send indicators of mission completion that include geolocation data corresponding to the first device at specific timestamps.

At block 325, the destination node may obtain data associated with the indicators of mission completion from the first device. In some implementations, the destination node may obtain data that may be used to validate the accuracy or completeness of the indicators of mission completion. For example, the data used to validate the indicators of mission completion may include timestamp data, geolocation data, communication data, etc. as described in relation activity validation in the description of FIG. 2.

At block 330, the destination node may obtain data relating to the mission from one or more second devices. In some implementations, the data relating to the mission from the second devices may be the same or a similar type of data as the data associated with the indicators of mission completion obtained from the first device at block 325.

At block 335, the destination node, a validation manager, or any other nodes may validate completion of the mission. In some implementations, validating completion of the mission by the first device may include a validation process as described in relation to FIG. 2.

At block 340, the destination node may send a mission reward to the first device. In some implementations, the mission reward may be sent via the process described in relation to FIG. 2, and the mission reward may include any mission rewards as described in relation to FIG. 2.

An example implementation of the operations of the method 300 may include missions related to an application or any other software configured to play music (referred to herein as a "music platform"). A particular first device may include one or more music platforms that facilitate playback of music for a user of the particular first device. A particular destination node may determine that the particular first device includes a threshold number of music platforms or a specific music platform and identify one or more missions related to the music platforms. For example, the particular destination node may identify a mission of playing a particular song on a particular music platform for a particular period of time (which may be verified by the particular music platform, the particular first device, the particular destination node, or any other devices). Responsive to determining and verifying that the particular song has been played in its entirety, the particular destination node may send a first mission reward to the particular first device.

Additionally or alternatively, the particular destination node may determine and verify that the particular song has been played partially (e.g., for one minute, for two minutes, etc.) and send a second mission reward to the particular first device. In some situations, the second mission reward may include the same or a similar type of mission rewards as the first mission reward but with a lower quantity. In these and other situations, the second mission reward may include a prorated payout relative to the first mission reward based on the duration that the particular song was played. Additionally or alternatively, the second mission reward may include any reduced mission reward quantity relative to the first mission reward.

The missions identified by the particular destination node relating to the music platforms may include any missions relating to operations or functions of the music platforms. For example, a mission may include listening to one or more songs written by a particular artist, of a particular music genre, or included in a particular music playlist. As further examples, a mission may include registering a user account with a particular music platform, compiling a music playlist on the particular music platform, interacting with one or more songs on the particular music platform (e.g., sharing a song on social media, commenting on a song, "liking" a song, etc.), or using a search function of the particular music platform to find one or more songs.

Additionally or alternatively, the missions identified by the particular destination node may relate to music artists rather than music listeners. For example, a mission may include publishing a song or an album on a particular music platform. As another example, a mission may include contributing one or more songs to a particular music playlist, such as a music festival playlist. As another example, a mission may include live streaming a music show via a particular music platform.

In some implementations, one or more indicators of mission completion may include data (e.g., cookies) relating to playback history of a song, a time at which the song finished playing on the particular first device, a geolocation of the particular first device when the song finished playing, or any other data. In some implementations, validation of mission completion by the particular first device may be provided by one or more other devices that access the music platform or the music platform itself. Additionally or alternatively, missions relating to submission or publication of music on the music platform may be validated by one or more devices corresponding to music listeners using the music platform. For example, mission completion of a mission relating to publishing a song on a particular music platform may be validated by one or more devices that indicate playback of the published song (e.g., five other devices have listened to the published song).

Modifications, additions, or omissions may be made to the method 300 without departing from the scope of the disclosure. For example, the designations of different elements in the manner described is meant to help explain concepts described herein and is not limiting. Further, the method 300 may include any number of other elements or may be implemented within other systems or contexts than those described.

Figure 4:
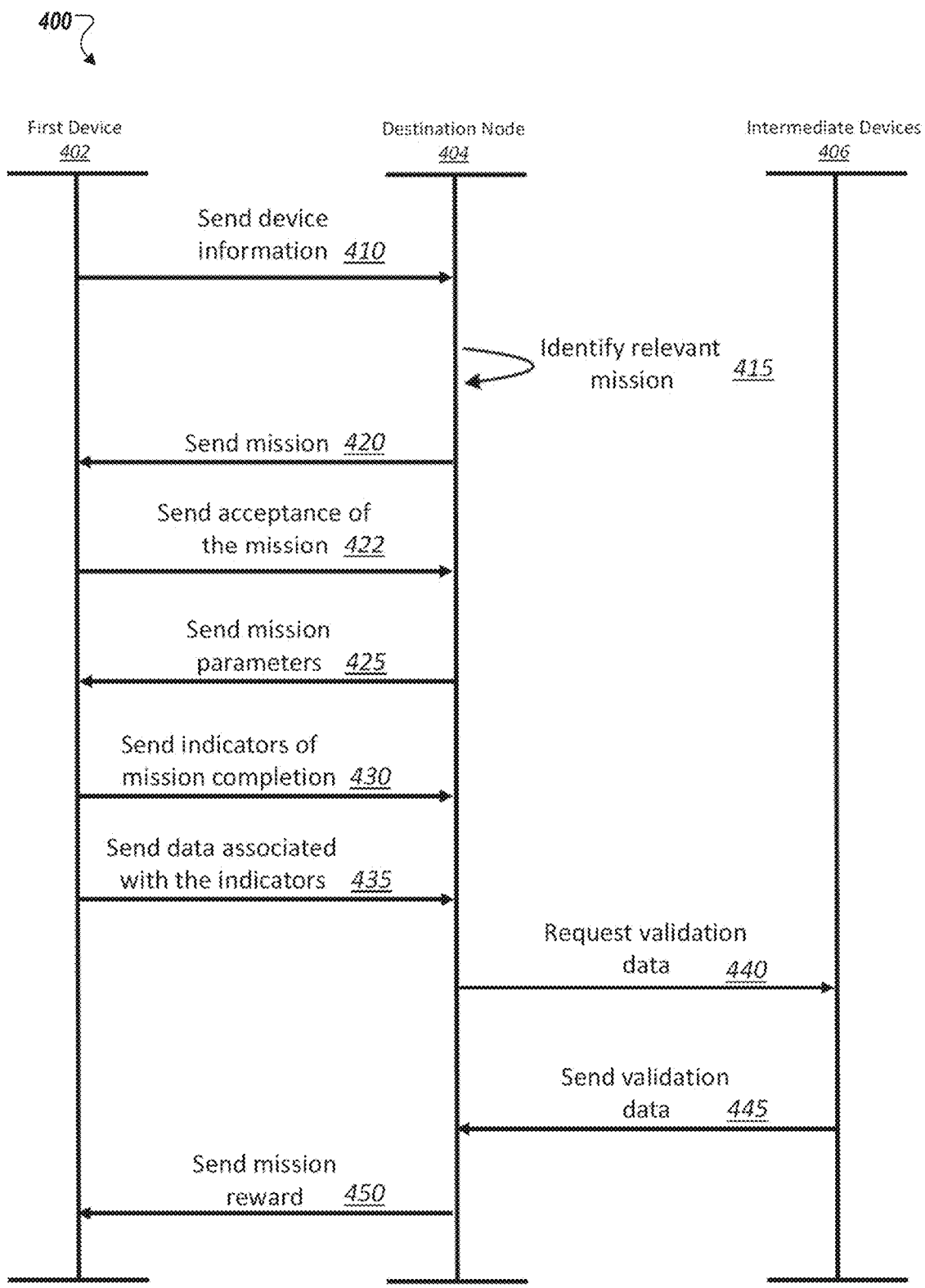
FIG. 4 illustrates an example sequence diagram of a process to assign an activity to a user device and validate completion of the activity in accordance with some implementations of this disclosure.

FIG. 4 illustrates an example sequence diagram 400 of a process to assign a mission to a user device and validate completion of the mission. The sequence diagram 400 may include components illustrated and described in FIGS. 1A, 1i, 2, and 3 such as a first device 402, a destination node 404, and intermediate devices 406.

At step 410, the first device 402 may send device information to the destination node 404. In some implementations, the first device 402 may include an intermediate device 115, which may be operated by a user. For example, the first device 402 may include a cellular device such as a smartphone that includes one or more software applications that are configured to facilitate communication between the cellular device and other intermediate devices (e.g., the intermediate devices 406) or destination nodes (e.g., the destination node 404). The first device 402 may be prompted to send device information describing the user or operations of the first device 402, such as by one or more of the software applications implemented on the first device 402 or according to input by the user of the first device 402.

At step 415, the destination node 404 may identify a relevant mission for the first device 402. The destination node 404 may compare the information received from the first device 402 with one or more missions stored at the destination node 404 (or at any other node). Based on the comparison, the destination node 404 may identify any missions that are relevant to the first device 402 based on the information received from the first device 402.

At step 420, the destination node 404 may send a mission to the first device 402. In some implementations, all of the missions identified at step 415, some of the missions (e.g., half of the relevant missions, twenty percent of the relevant missions, three of the relevant missions etc.), or only the most relevant mission may be sent to the first device 402. In some implementations, the user of the first device 402 may set the number or relevance of the missions to be sent by the destination node 404. Additionally or alternatively, the number of missions to be sent may depend on the computing capabilities of the destination node 404, the first device 402, or any other nodes related to the communication between the first device 402 and the destination node 404 (e.g., an intermediary super node between the first device 402 and the destination node 404).

At step 425, the destination node 404 may send one or more mission parameters associated with the mission to the first device 402. In some implementations, the mission parameters may be sent to the first device 402 concurrently with the mission. Additionally or alternatively, the destination node 404 may send the mission parameters to the first device 402 in response to receiving information from the first device 402 indicating acceptance of the mission (e.g., sending acceptance of the mission at an optional step 422).

At step 430, the first device 402 may send one or more indicators of mission completion to the destination node 404. In some implementations, the indicators of mission completion may include a message generated by the first device 402 that affirmatively indicates that the mission sent to the first device 402 was completed. Additionally or alternatively, the indicators of mission completion may include information about the first device 402 that are responsive for satisfying the mission parameters sent by the destination node 404.

At step 435, the first device 402 may send data associated with the indicators of mission completion to the destination node 404. In some implementations, the data associated with the indicators of mission completion may include metadata describing the indicators of mission completion sent by the first device 402 or metadata describing the first device 402 as described in relation to the method 300 with respect to FIG. 3.

At step 440, the destination node 404 may request validation data from one or more of the intermediate devices 406. The destination node 404 may request validation data that is the same as or similar to the data associated with the indicators of mission completion that the destination node 404 received from the first device 402 such that a computing system or other processor associated with the destination node 404 may compare the validation data from the intermediate devices 406 with the data associated with the indicators of mission completion from the first device 402.

At step 445, the intermediate devices 406 may send the validation data to the destination node 404. In some implementations, the intermediate devices 406 may include devices that are the same type as or a similar type as the first device 402, and each of the intermediate devices 406 may have also performed the same mission as or a similar mission as the first device 402. In some implementations, the request for validation data at step 440 may be similar to the mission sent to the first device 402 at step 420, and the intermediate devices 406 sending the validation data to the destination node 404 may be similar to sending the indicators of mission completion or the data associated with the indicators of mission completion at steps 430 and 435, respectively.

At step 450, the destination node 404 may send a mission reward to the first device 402. In some implementations, the destination node 404 may send the mission reward via the process described in relation to FIG. 2, and the mission reward may include any mission rewards, such as those described in relation to FIG. 2.

In some implementations, mission validation according to the present disclosure may be performed by a computing system (e.g., a super node, a validation manager, a computing system associated with the destination node 404) such that the computing system may generate a blockchain according to the sequence diagram 400. For example, a first block of a particular blockchain may include the device information sent by the first device 402 to the destination node 404 at step 410, and a second block of the particular blockchain may include a cryptographic hash of the device information and the mission identified as being relevant to the device information by the destination node 404 at step 415. In other words, after performing one or more of the steps 410-450 of the sequence diagram 400, a blockchain may be updated to facilitate secure validation of mission completion by the first device 402 or the user of the first device 402.

Figure 5:
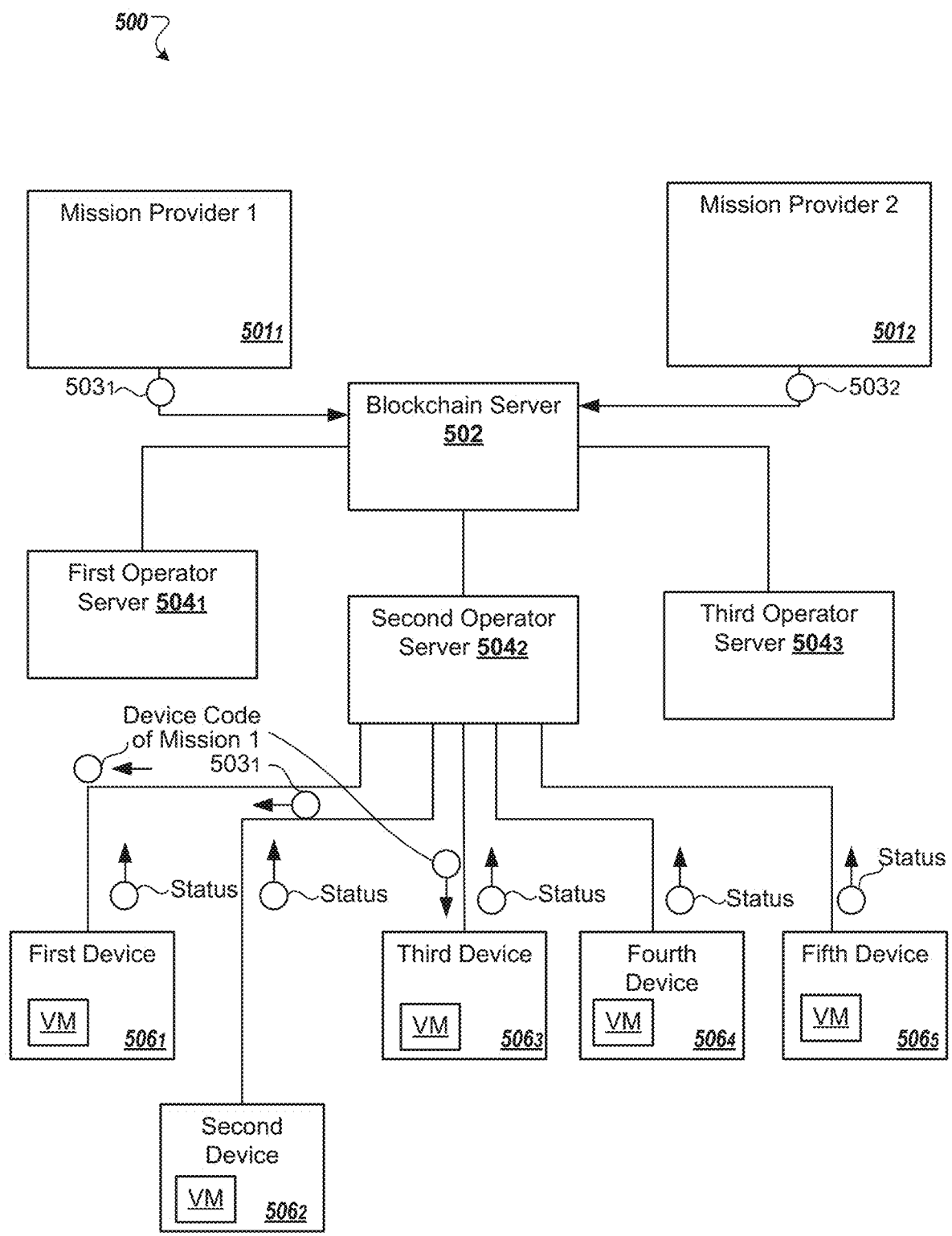
FIG. 5 is a simplified schematic view of an example mission network 500 in accordance with some implementations of this disclosure.

Missions also provide more functionality of a network (e.g., network in FIG. 1, network in FIG. 5). Missions may allow anyone to program the network's smartphones and devices to execute a custom piece of code, or action for a given context. Missions make the network programmable, meaning that developers and builders can come in and easily create apps on top of infrastructure in exchange for a fee in tokens. New features and products may be built atop missions themselves such as asset tracking, data collection, security checks, Non Fungible Tokens (NFT) geographic airdrops, social networking, or even referrals.

FIG. 5 is a simplified schematic view of an example mission network 500 in accordance with some implementations of this disclosure. As shown, the example mission deployment network 500 may include a blockchain server 502 (e.g., Parachain integrated within Polkadot and Kusama networks), a plurality of operator servers 504 (e.g., first operator server $504_1$, second operator server $504_2$, third operator server $504_3$) in communication with the blockchain server 502, a plurality of devices in communication with the first operator server $504_1$ (not shown), a plurality of devices in communication with the third operator server $504_3$ (not shown), and a plurality of devices (e.g., first device $506_1$, second device $506_2$, third device $506_3$, fourth device $506_4$, fifth device $506_5$) in communication with the second operator server $504_2$.

As shown, the blockchain server 502 is configured to receive or obtain missions 503 (e.g., mission 1 $503_1$, mission 2 $503_2$) from mission providers 501 (e.g., mission provider 1 $501_1$, mission provider 2 $501_2$). In some implementations, a mission 503 includes a first code (also referred as device code) and a second code (also referred as chain code). In some implementations, the device code is configured to execute at the devices 506 that are exposed to the mission 503. In some implementations, the devices 506 are provided or configured with a virtual machine (e.g., WebAssembly virtual machine), and the device code (e.g., WebAssembly code) is configured to execute on the virtual machine. In some implementations, the chain code is configured to execute at the blockchain server 502. In some implementations, the chain code is executed via contract pallet of Parity Substrate (or a variant) and supports the ink!domain-specific language (based on the rust language with some extra syntactic sugar) or any other language that compiles to WebAssembly with the correct application programming interfaces exposed, such as ask!(which uses AssemblyScript, a TypeScript-like language for WebAsembly).

In some implementations, the blockchain server 502 serves as a system that links multiple components of network 500 together and handles settlement (e.g., payments) for usage of the network 500. In some implementations, each of devices 506 is implemented with a mission application (e.g., mission interface) that is configured to communicate with the operator server 504 and the blockchain server 502. In some implementations, the mission application allows a user to download a mission 503. In some implementations, the device 506 includes one or more computing devices with communication capabilities (e.g., smartphone, smart watch, smart glasses, smart ring, computer). In some implementations, the device 506 includes the intermediate device 115 in FIG. 1A. In some implementations, the device 506 includes the endpoint device 105 in FIG. 1A.

In some implementations, the blockchain server 502 is configured to maintain a registry of missions that are provided or deployed by the mission providers 501. For example, in response to obtain a mission 503, the blockchain server 502 updates the mission registry of the blockchain server 502 with the mission 503. In some implementations, the chain code portion of a mission 503 exposes standardized application programing interfaces (also referred as standard mission interface) which provide standardized calls and application programing interfaces for special smart contracts like tokens. In some implementations, these standardized calls are used to identify each mission 503 before they are provided or deployed to the devices 506.

As discussed, the blockchain server 502 is configured to receive or obtain the mission 503. In some implementations, the mission 503 includes the chain code and an address information of the device code (e.g., content address to locate the device code stored on the InterPlanetary File System).

In some implementations, the operator server 504 (e.g., first operator server $504_1$, second operator server $504_2$, third operator server $504_3$) is configured to detect a mission 503 (e.g. new mission) at the blockchain server 502. For example, the operator server 504 detects a mission 503 (new mission) based on detecting a new mission in the mission registry at the blockchain server 502. In some implementations, upon detecting the mission 503, the operator server 504 is configured to determine whether the mission 503 meets predefined criteria. The predefined criteria will be discussed later in this disclosure. In some implementations, in response to a determination that the mission meets the predefined criteria, the operator server 504 exposes at least one device 506 to the mission 503 (e.g., devices 506 that are selected to carry out the mission 503). In the example shown in FIG. 5, the second operator server $504_2$ detects two new missions $503_1$ $503_2$ from the mission provider 1 $501_1$ and the mission provider 2 $501_2$ respectively by detecting the missions $503_1$ $503_2$ in the mission registry of the blockchain server 502. As shown, in the example in FIG. 5, the second operator server $504_2$ determines that the mission 1 $503_1$ from the mission provider 1 $501_1$ meets the predefined criteria. As a result, the second operator server $504_2$ may expose the mission 1 $503_1$ to all of the devices $506_{1-5}$ in communication with the second operator server $504_2$. However, as shown in the example in FIG. 5, the second operator server $504_2$ may expose the mission 1 $503_1$ to devices 506 that are suitable to carry out the mission 1 $503_1$ based on status of each devices 506. In this example, the second operator server $504_2$ exposes the mission 1 $503_1$ to three device $506_{1-3}$ that are determined to be suitable to carry out the mission 1 $503_1$.

In some implementations, when the mission 503 does not meet the predefined criteria, the operator server 504 does not expose the mission 503 to the devices 506 in communication with the operator server 504. As shown in the example in FIG. 5, the second operator server $504_2$ determines that the mission 2 $503_2$ does not meet the predefined criteria. As a result, the second operator server $504_2$ does not expose the mission 2 $503_2$ to devices $506_{1-6}$ in communication with the second operator server $504_2$.

In some implementations, the operator server 504 is configured to receive or obtain a device code associated with the mission 503. In some implementations, the operator server 504 is configured to provide the device code to the at least one device 506 to the mission (e.g., devices 506 that are selected to carry out the mission 503). By providing the device code, the operator server 504 causes the device to execute the device code on a virtual machine of each of the at least one device 506 (e.g., devices that are selected to carry out the mission 503). In some implementations, the device code is configured to call back into a chain code on the blockchain server 502 upon completing the mission 503. For example, the device code has the ability to call back into the chain code with an arbitrary set of parameters (e.g., signed sequence of bytes, pre-computed secret). These parameters may be a piece of data that the chain code can verify (proof) or evident of certain fact (attestation). The chain code may verify this data and unlock reward (e.g., token) for the operator server 504 and/or user of the device 506 (mission application user).

As shown in the example in FIG. 5, the second operator sever $504_2$ provides the device code of mission 1 $503_1$ to three devices $506_{1-3}$ that the second operator server $504_2$ determined to be suitable to carry out the mission 1 $503_1$. As a result, each of the devices $506_{1-3}$ is able to carry out the mission by executing the device code associated with the mission 1 $503_1$ on the virtual machine.

In some implementations, in response to detecting the mission 503 at the blockchain server 502, the operator server 504 is configured to obtain the mission 503. In some implementations, the mission 503 includes a chain code associated with the mission 503, a first address information of a device code (e.g., content address to locate the device code stored on the InterPlanetary File System) associated with the mission 503, and a second address information of metadata (e.g., content address to locate the metadata stored on the InterPlanetary File System) associated with the mission 503. As discussed, the chain code is configured to execute at the blockchain server 502. In some implementations, the metadata includes at least one of a mission category of the mission 503, a reward associating with carrying out the mission 503, a geographic boundary information, or a device information.

In some implementations, the operator server 504 is configured to obtain the device code associated with the mission 503 based on the first address information. In some implementations, the operator server 504 is configured to obtain the metadata associated with the mission 503 based on the second address information. In some implementations, the operator server 504 is configured to determine whether the device code associated with the mission 503 complies with a restriction. In some implementations, the operator server 504 is configured to determine whether the mission 503 complies with a restriction based on the metadata associated with the mission 503. In some implementations, the operator server 504 is configured to determine whether the device code associated with the mission 503 complies with a restriction and is further configured to determine whether the mission 503 complies with a restriction based on the metadata associated with the mission 503.

In some implementations, the operator server 504 determines whether the mission 503 meets the predefined criteria based on a set of permissions required to carry out the mission 503. In some implementations, determining whether the mission 503 meets the predefined criteria includes determining whether the mission 503 complies with a restriction. For example, for security and transparency, the mission 503 may specify a set of permissions required to execute the device code associated with the mission 503. For example, the set of permissions includes an access to camera of the device 506, an access to GPS location of the device 506, and an access to microphone of the device 506. If the operator server 504 (and/or device 506 in communication with the operator server 504) has a restriction against one or more of the required permissions (e.g., access to camera, access to microphone), the operator server 504 may not expose the mission 503 to the device 506 in communication of the operator server 504. In some implementations, the operator server 504 may still expose the devices in communication with the operator server 504 to the mission 503 regardless. However, in this case, the device code can be executed upon obtaining an approval from a device user.

In some implementations, the operator server 504 determines whether the mission 503 meets the predefined criteria based on an author of the mission 503. For example, if the author of the mission 503 is in a whitelist (e.g., whitelist of the operator server 504), the mission meets the predefined criteria. In some implementations, the operator server 504 determines whether the mission 503 meets the predefined criteria based on a reward associated with carrying out the mission 503. In some implementations, the reward information is in the metadata. For example, the reward associated with carrying out the mission 503 includes a first reward for the operator server 504 and a second reward for the at least one device 506. For example, the second operator server $504_2$ may not expose the devices $506_{1-3}$ to the mission 1 $503_1$ if the second operator server $504_2$ does not get any reward for exposing the mission 1 $503_1$.

As shown in the example in FIG. 5, the second operator server $504_2$ obtains the mission 1 $503_1$ including device code and metadata associated with the mission 1 $503_1$. For example, if the second operator server $504_2$ determines that an access to a camera on the device 506 is required to execute the device code based on its review of the device code (and/or metadata) and the access to microphone is restricted by the second operator server $504_2$, the second operator server $504_2$ may not expose the devices $506_{1-3}$ to the mission 1 $503_1$. Similarly, if the second operator server $504_2$ determines that an access to microphone on the device 506 is required to execute the device code based on its review of the device code (and/or metadata) and the access to microphone is restricted by the devices 506 in communication with the second operator server $504_2$, the second operator server $504_2$ may not expose the devices $506_{1-3}$ to the mission 1 $503_1$.

As discussed, the operator server 504 is configured to detect the mission 503 (e.g., new mission) by monitoring the mission registry of the blockchain server 502. In some implementations, the operator server 504 is configured to maintain status of devices 506 in communication with the operator server 504. For example, the second operator server $504_2$ maintains location status (e.g., global positioning system location) of each device 506 (e.g., first device $506_1$, second device $506_2$, third device $506_3$, fourth device $506_4$, fifth device $506_5$) in communication with the second operator server $504_2$. For another example, the second operator server $504_2$ maintains online/offline status of each device 506 in communication with the second operator server $504_2$. In some implementations, the operator server 504 is configured to expose one or more devices 506 to the mission 503 based on the status. For example, if the mission 503 has a location boundary (e.g., GPS location boundary), the operator server 504 may expose devices 506 (in communication with the second operator server $504_2$) that are online and located within the location boundary. As shown in the example in FIG. 5, the second operator server $504_2$ does not expose the fourth device $506_4$ and the fifth device $506_5$ to the mission 1 $503_1$ because the device $506_{4-5}$ are not in the location required to carry out the mission 1 $503_1$.

In some implementations, each of the devices 506 that are exposed to the mission 503 by the operator server 504 is configured to obtain the device code from the operator server 504. In some implementations, each of the devices 506 is configured to verify that the device code is from the operator server 504. In some implementations, each of the devices 506 execute the device code on a virtual machine. In some implementations, each of the devices 506 is configured to call back into the chain code (that is associated with the mission 503) on a blockchain server 502. In some implementations, by calling back into the chain code on the block chain server 502 causes the blockchain server 502 to provide compensation for carrying out the mission 503.

As discussed, in some implementations, each of the devices 506 is provided or configured with a virtual machine (e.g., WebAssembly virtual machine), and the device code (e.g., code for WebAssembly) is configured to execute on the virtual machine. In some implementations, the virtual machine is configured to support various calls (e.g., accesses) so that the device code can be executed properly. For example, the virtual machine may provide Internet access to the device code. For example, if the device code was granted with the appropriate permissions, it may be able to communicate with a remote server hosted on the Internet. This could take the form of a normal Hypertext Transfer Protocol (HTTP) request or more complex networking schemes. For another example, the virtual machine may provide call back to the device code: given an arbitrary set of parameters and a chain code address, this may trigger a call back to the blockchain server 502. For another example, the virtual machine may provide the device code attestation and may rely on the mission application's built-in protection mechanisms and its interactions with the operator server 504 to return an attestation that the mission application is running on a device considered genuine. For another example, the virtual machine may provide the device code access to Bluetooth low energy APIs for broadcasting of beacons in various formats, scanning of nearby devices, and handling generic attributes (GATT) queries. For another example, the virtual machine may provide the device code access to wallet address and blockchain server 502 addresses may offer separate calls to query the host's address, the mission application integrator address, or the mission chain code's address.

As discussed, in some implementations, the chain code (at the blockchain server 502) is a component the device code calls back into. In some implementations, the chain code takes the form of a WebAssembly smart contract running on the blockchain server 502 (e.g., Parachain). As such, in some implementations, it can access various on-chain primitives which may allow mission providers 501 (e.g., mission builders) to create new use cases, economics, and reward mechanisms: native cryptocurrency transfers, third-party assets, Non Fungible Tokens (NFTs), mission registry, and interoperability primitives (XCM). In some implementations, the native cryptocurrency (e.g., token) transfers primitive allows checking one's balance, transferring tokens held in the chain code contract, requesting payments in token. In some implementations, the third-party assets primitive allows creating and managing a new token, transferring tokens held in the chain code contract, and requesting payments with third-party assets. In some implementations, Non Fungible Tokens (NFTs) primitive used to issue or request NFTs present on the blockchain server (e.g., Parachain). In some implementations, the mission registry primitive allows querying the registry for currently deployed missions and their metadata or deploying a new mission. In some implementations, the interoperability primitives (XCM) supports calling functions on other blockchain server (e.g., Parachains) and sending tokens or other assets across the network such as Polkadot network.

In some implementations, each mission's chain code may expose a set of functions and storage values that may be used by operator servers 504 to filter out which mission the operator servers 504 may execute, and by the mission application to correctly classify each mission 503. For example, in some implementations, each mission's chain code may expose a function that returns the IPFS document hash identifying the associated device code. This allows the operator server 502 and mission application instances to download the appropriate code (e.g., device code) to perform the mission 503. As discussed, in some implementations, device code is available through IPFS. For example, in some implementations, each mission's chain code may expose a function that returns the IPFS document hash of a metadata file. Such metadata may include: a (short) name, a (longer form) description, logos to be displayed on various frontends, links to the developer's website for more information, the type and amount of rewards one collects, such as a certain amount of tokens, or special NFTs, the mission's high-level category such as whether it is an asset tracking mission or a positional mission which is restricted to a certain area, and/or additional parameters depending on the mission's category. For example, for asset tracking, the metadata may contain a target filter which filters what kind of devices the developer is looking for as well as an optional geographic bound. For another example, for positional missions, the developer may specify the geographic bound in which the mission is available. In some implementations, the metadata include webAssembly virtual machine requirements such as the memory necessary for the execution of the device code.

While it is desirable to support the most missions possible, this may be done in a way that respects the network's capacity. Meaning that the network should not have more missions than it can handle being deployed at any time. Therefore, the following mechanisms may be implemented: deployment fee, state rent, and transaction fees.

A dynamic fee system is configured to scale up the cost to deploy a mission 503 depending on the current network usage. A simple solution could be to rely on a constant maximum number of missions 503 and a polynomial function that outputs the fee for the next mission deployment should be sufficient for a first implementation. In some implementations, the tokens used to pay this fee is partially sent to the Decentralized Autonomous Organization (DAO) treasury and partially burned, thus reducing the maximum supply of the network. State rent is an incentive for builders to "self-destruct" their missions 503 once they are no longer relevant. This is done by asking them to lock a certain amount of tokens which is refunded to them once the mission's chain code self-destructs. Thus freeing the resources used by the network to support it. Transaction fees for deploying a new mission 503 or interacting with one may also come at a small cost in the form of tokens which are to be split between the block creator and the DAO treasury.

Figure 6:
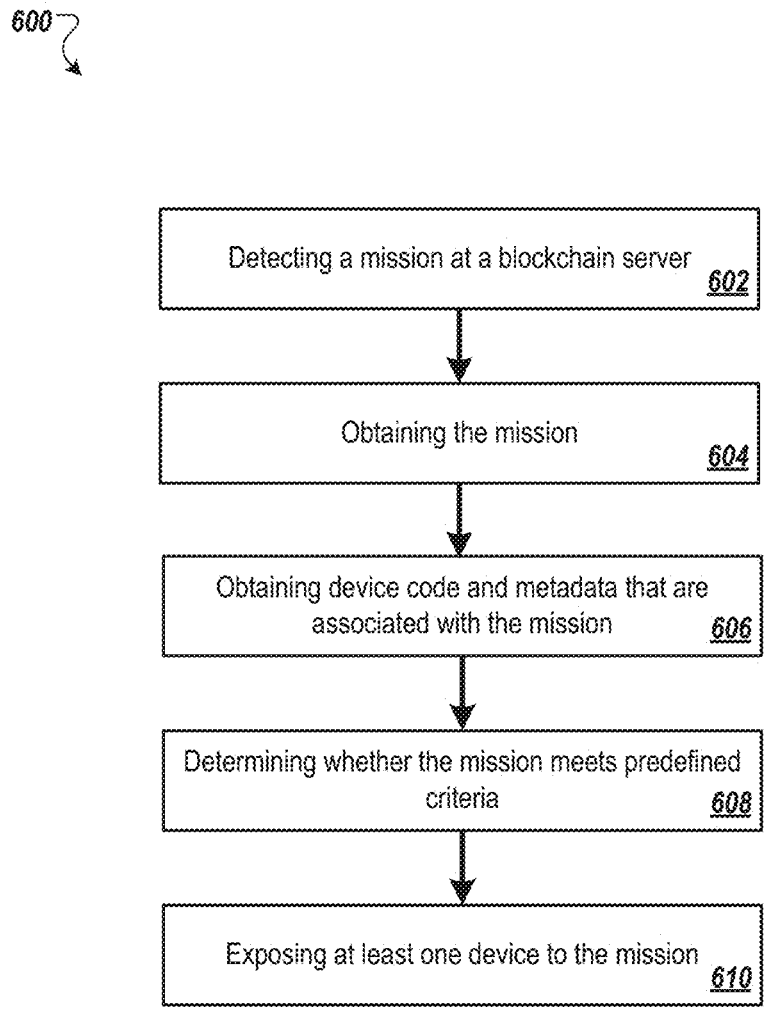
FIG. 6 illustrates a flowchart of an example method of exposing one or more devices to a mission.

FIG. 6 illustrates a flowchart of an example method 600 of exposing one or more devices 506 to a mission 503. The method 600 may be performed by processing logic that may include hardware (circuitry, dedicated logic, processor(s), memory, etc.), software (such as is run on a general purpose computer system or a dedicated machine), or a combination of both, which processing logic may be included in any computer system (e.g., computing device 800 in FIG. 8) or device. For simplicity of explanation, methods described herein are depicted and described as a series of acts. However, acts in accordance with this disclosure may occur in various orders and/or concurrently, and with other acts not presented and described herein. Further, not all illustrated acts may be used to implement the methods in accordance with the disclosed subject matter. In addition, those skilled in the art will understand and appreciate that the methods may alternatively be represented as a series of interrelated states via a state diagram or events. Additionally, the methods disclosed in this specification are capable of being stored on an article of manufacture, such as a non-transitory computer-readable medium, to facilitate transporting and transferring such methods to computing devices. The term article of manufacture, as used herein, is intended to encompass a computer program accessible from any computer-readable device or storage media. Although illustrated as discrete blocks, various blocks may be divided into additional blocks, combined into fewer blocks, or eliminated, depending on the desired implementation.

The method 600, at operation 602, includes detecting, by an operator server 504, a mission 503 at a blockchain server 502. The blockchain server 502 is in communication with the operator server 504. As discussed, in some implementations, the operator server 504 is configured to detect the mission 503 (e.g., new mission) by monitoring the mission registry of the blockchain server 502.

In response to detecting the mission 503, the method 600, at operation 604, includes obtaining, by the operator server 504, the mission 503. In some implementations, the mission includes a chain code associated with the mission 503, a first address information of a device code (e.g., content address to locate the device code stored on the InterPlanetary File System) associated with the mission 503, and a second address information of metadata (e.g., content address to locate the metadata stored on the InterPlanetary File System) associated with the mission 503.

The method 600, at operation 606, includes obtaining, at the operator server 504, the device code associated with the mission 503 based on the first address information and obtaining, at the operator server 504, the metadata associated with the mission 503 based on the second address information.

The method 600, at operation 608, includes determining whether the mission 503 meets predefined criteria. In some implementations, determining whether the mission 503 meets predefined criteria includes at least one of: determining, by the operator server 504, whether the device code associated with the mission 503 complies with a restriction, or determining, by the operator server 504, whether the mission 503 complies with a restriction based on the metadata associated with the mission 503.

In response to a determination that the mission 503 meets the predefined criteria, the method 600, at operation 610, includes exposing at least one device 506 to the mission 503. The least one device 506 in communication with the operator server 504.

Figure 7:
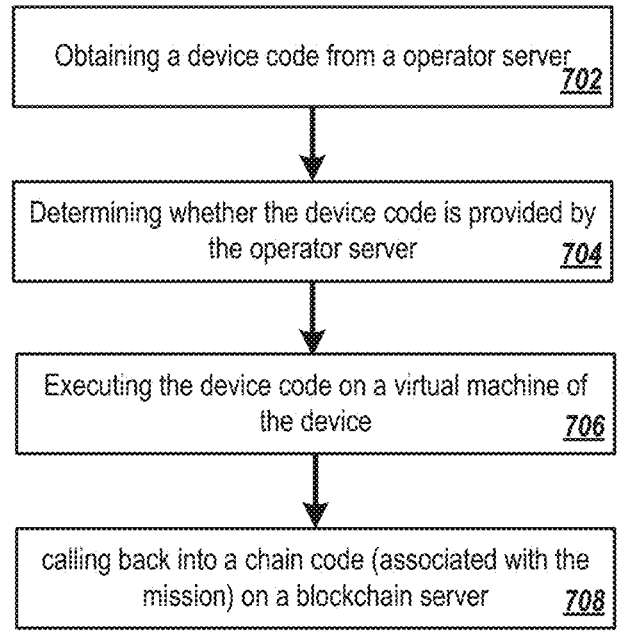
FIG. 7 illustrates a flowchart of an example method of executing a mission at a device.

FIG. 7 illustrates a flowchart of an example method 700 of executing a mission 503 at a device 506. The method 700 may be performed by processing logic that may include hardware (circuitry, dedicated logic, processor(s), memory, etc.), software (such as is run on a general purpose computer system or a dedicated machine), or a combination of both, which processing logic may be included in any computer system (e.g., computing device 800 in FIG. 8) or device. For simplicity of explanation, methods described herein are depicted and described as a series of acts. However, acts in accordance with this disclosure may occur in various orders and/or concurrently, and with other acts not presented and described herein. Further, not all illustrated acts may be used to implement the methods in accordance with the disclosed subject matter. In addition, those skilled in the art will understand and appreciate that the methods may alternatively be represented as a series of interrelated states via a state diagram or events. Additionally, the methods disclosed in this specification are capable of being stored on an article of manufacture, such as a non-transitory computer-readable medium, to facilitate transporting and transferring such methods to computing devices. The term article of manufacture, as used herein, is intended to encompass a computer program accessible from any computer-readable device or storage media. Although illustrated as discrete blocks, various blocks may be divided into additional blocks, combined into fewer blocks, or eliminated, depending on the desired implementation.

The method 700, at operation 702, includes obtaining, at a device 506, a device code from an operator server 504. The device 506 is in communication with the operator server 504. The device code associated with a mission 503.

The method 700, at operation 704, includes determining, at the device 506, whether the device code is provided by the operator server 504 in communication with the device 506.

In response to a determination that the device code is provided by the operator server 504 in communication with the device 506, the method 700, at operation 706, includes executing the device code on a virtual machine of the device 506.

The method 700, at operation 708, includes calling back into a chain code (associated with the mission 503) on a blockchain server 502. As discussed, calling back into the chain code on the block chain server 502 causes the blockchain server 502 to provide compensation for carrying out the mission 503.

Figure 8:
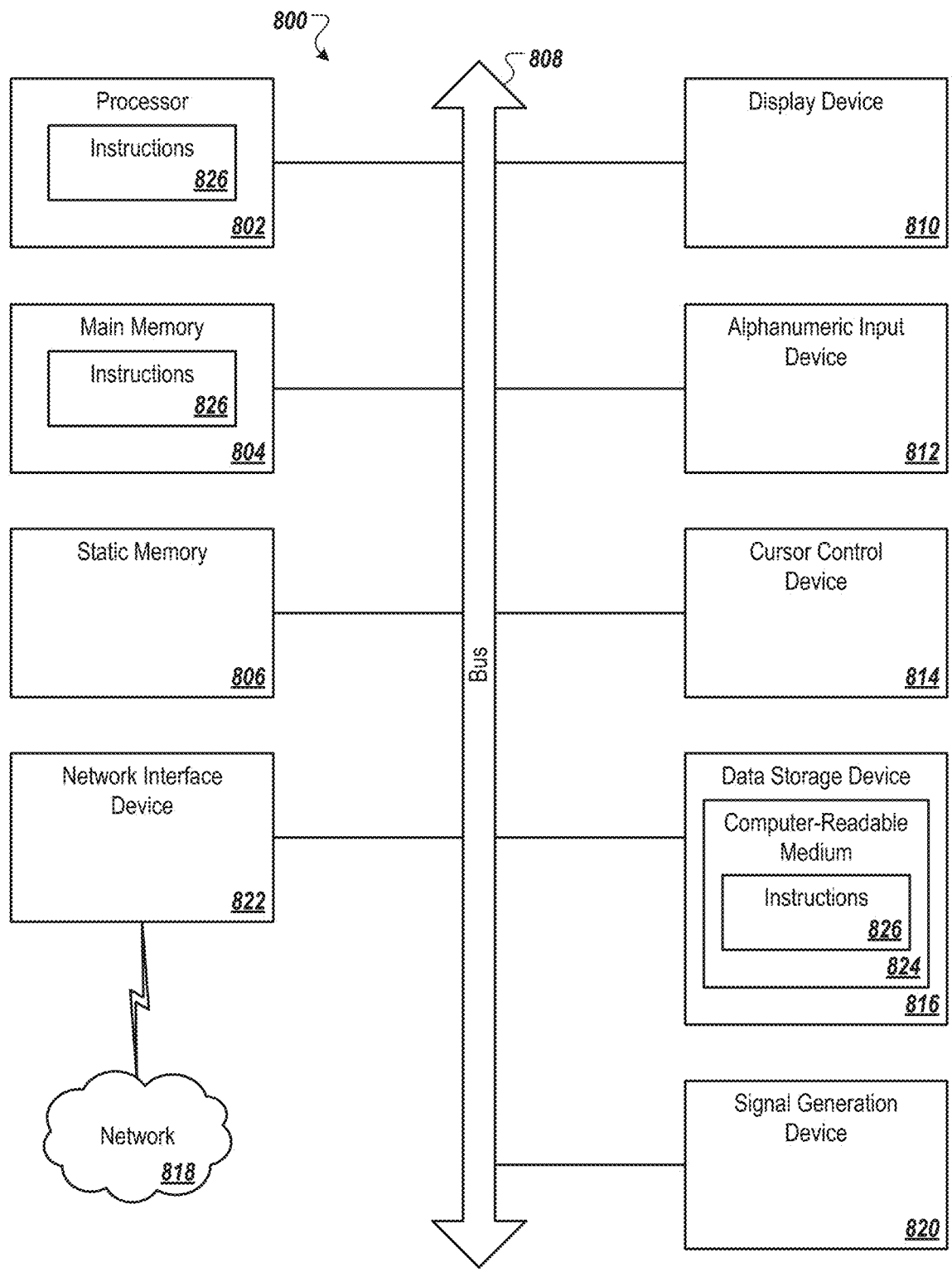
FIG. 8 illustrates a diagram representing a machine in the example form of a computing device within which a set of instructions, for causing the machine to perform any one or more of the methods discussed herein, may be executed, all arranged in accordance with some implementations of this disclosure.

FIG. 8 illustrates a diagram representing a machine in the example form of a computing device within which a set of instructions, for causing the machine to perform any one or more of the methods discussed herein, may be executed. The computing device 800 may include a mobile phone, a smart phone, a netbook computer, a rack mount server, a router computer, a server computer, a personal computer, a mainframe computer, a laptop computer, a tablet computer, a desktop computer, or any computing device with at least one processor, etc., within which a set of instructions, for causing the machine to perform any one or more of the methods discussed herein, may be executed. In alternative implementations, the machine may be connected (e.g., networked) to other machines in a LAN, an intranet, an extranet, or the Internet. The machine may operate in the capacity of a server machine in client-server network environment. The machine may include a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" may also include any collection of machines that individually or jointly execute a set (or multiple sets) of instructions to perform any one or more of the methods discussed herein.

The example computing device 800 includes a processing device (e.g., a processor) 802, a main memory 804 (e.g., read-only memory (ROM), flash memory, dynamic random access memory (DRAM) such as synchronous DRAM (SDRAM)), a static memory 806 (e.g., flash memory, static random access memory (SRAM)) and a data storage device 816, which communicate with each other via a bus 808.

Processing device 802 represents one or more general-purpose processing devices such as a microprocessor, central processing unit, or the like. More particularly, the processing device 802 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 802 may also include one or more special-purpose processing devices such as an application specific integrated circuit (ASIC), a field programmable gate array (FPGA), a digital signal processor (DSP), network processor, or the like. The processing device 802 is configured to execute instructions 826 for performing the operations and steps discussed herein.

The computing device 800 may further include a network interface device 822 which may communicate with a network 818. The computing device 800 also may include a display device 810 (e.g., a liquid crystal display (LCD) or a cathode ray tube (CRT)), an alphanumeric input device 812 (e.g., a keyboard), a cursor control device 814 (e.g., a mouse) and a signal generation device 820 (e.g., a speaker). In at least one implementation, the display device 810, the alphanumeric input device 812, and the cursor control device 814 may be combined into a single component or device (e.g., an LCD touch screen).

The data storage device 816 may include a computer-readable storage medium 824 on which is stored one or more sets of instructions 826 embodying any one or more of the methods or functions described herein. The instructions 826 may also reside, completely or at least partially, within the main memory 804 and/or within the processing device 802 during execution thereof by the computing device 800, the main memory 804 and the processing device 802 also constituting computer-readable media. The instructions may further be transmitted or received over a network 818 via the network interface device 822.

While the computer-readable storage medium 826 is shown in an example implementation to be a single medium, the term "computer-readable storage medium" may include a single medium or multiple media (e.g., a centralized or distributed database and/or associated caches and servers) that store the one or more sets of instructions. The term "computer-readable storage medium" may also include any medium that is capable of storing, encoding or carrying a set of instructions for execution by the machine and that cause the machine to perform any one or more of the methods of the present disclosure. The term "computer-readable storage medium" may accordingly be taken to include, but not be limited to, solid-state memories, optical media and magnetic media.

Implementations described herein can be used to track an asset. For example, a mission provider 501 (asset tracking company in this example) provides a device code that is configured to monitor (e.g., listening mode) BLE scan result from the device 506. In some implementations, the device code is able to obtain the BLE scan result via a mission application installed on the device 506. For each asset found based on the BLE scan result (e.g., arbitrary set of parameters transmitted from target asset), the device code is configured to transmit the tracking result (based on successful ping) to the mission provider 501 (e.g., server of the mission provider 501). As a result, the mission provider 501 provides a "receipt" (e.g., signed sequences of bytes) which is then submitted to the blockchain server 502 (e.g., Parachain) to unlock the reward (e.g., cryptocurrency token). In response to receiving the "receipt," a chain code on the blockchain server 502 unlocks the hardcoded reward. The associated metadata identifies the mission to be part of the asset tracking category and to be restricted to a target location (e.g., the city of New York) so that asset tracking mission is carried out by device 506 located in the target location.

The mission provider 501 may deploy this mission (i.e., asset tracking mission) by deploying the chain code on the blockchain server 502 (e.g., Parachain) and paying the appropriate fees described above, and preloading it with enough tokens to support the necessary pings. Right as the chain code gets instantiated, other actors of the Nodle Network perform a series of actions. The blockchain server 502 pin the device code and metadata IPFS documents on its server. The operator server 504 detect that a new mission 503 is instantiated. The operator server 504 obtain the chain code, the device code, and its metadata. Once the mission is downloaded, the operator server 504 may filter it through its proprietary logic to define whether it wants to execute the mission 503. Typically, it may look for whether they have devices in the target location (e.g., New York), and whether it satisfies its restrictions. Such restrictions might cover which developers are allowed to track which kind of devices. If the operator server 504 is willing to support the mission 503, it may look for devices 506 close to or in the target location, and load them with the appropriate device code.

Whenever a device 506 detects the target asset as instructed by its operator server 504 and the mission's metadata, it may call into the mission's device code. The device code may perform its normal sequence of operations. In this example, it reports the device identifier, the device's GPS position, and an eventual attestation that it is a genuine device 506 to the mission provider's server. The server of the mission provider 501 then replies with a signed receipt that can then be used to claim the token payment from the chain code. This transaction may go through the operator server 504. The device 506 may notify the operator server 504 of the transaction to be sent via an internal API. In the case of the mission application, it would send the transaction using the user's wallet, either in the background or after asking the user for its approval.

If the mission 503 runs out of tokens to pay out devices 506, the mission provider 501 might re-provision it with additional tokens. The mission provider 501 might also decide to deactivate the mission 503 once they no longer need it, or if it runs out of funds. If it so wishes, it would trigger the appropriate transaction which would have the following chain reaction. The chain code would be marked as uninstalled on the blockchain server 502, thus reducing the state size to be maintained by its collators. If necessary, the chain code might send any funds left back to its deployer (e.g., mission provider 501). The operator server 504 monitors the blockchain server 502 and detects that the mission 503 was deactivated. The operator server 504 free the appropriate resources on its side and command their devices 506 to uninstall the mission's device code.

Implementations described herein can be used for geographic airdropping. For example, a mission provider 501 (coffee shop chain in this example) may create a mission 503 to attract new customers to their shops around a target area (e.g., Europe). Instead of deploying one mission for each shop, the mission provider 501 may deploy one global mission 503 that checks the user's positioning and relies on the attestation mechanism described in Mobile Wasm VM API to claim an NFT voucher which can be redeemed for a free coffee. To prevent users from abusing their marketing program and getting too many free coffees they may impose some restrictions checked by the chain code. For example, the users may have been awarded by the reward (e.g., cryptocurrency token), showing that they spent some time running the mission application on their device 506. By ensuring that the reward was minted as a network reward, and thus may not record tokens sent from another wallet. As a result, the user cannot claim the voucher NFT twice with the same account. To enforce this, the chain code records which account claimed an NFT and prevents double claiming.

The mission provider 501 can deploy the mission 503 along with paying the appropriate fees. The mission 503 includes a chain code that receives an attestation that a device 506 instance is genuine. If this attestation is valid, it should double-check how many rewards (cryptocurrency token) the caller got awarded previously and whether it already minted a voucher NFT before minting it. The mission 503 includes a device code which is configured to get an attestation that the device code is running on a genuine device 506 and checks its position. If the device is at one of the target locations, the device code sends the attestation to the chain code via a blockchain server transaction.

The operator server 504 might ignore the mission 503 due to not enough reward for the operator sever 504 for managing the mission 503. However, the mission 503 may be available in the mission application (installed at the device 506) where users can choose to install the mission 503 before or when visiting one of the target locations (coffee shop in this example). Alternatively, it could be assumed that the mission 503 is downloaded in the background if the mission application is configured appropriately by its users. Additionally, at the target locations, the mission provider 501 could display a QR Code with a deep link to auto-install their mission, or embed it in their mobile application if they have one.

Implementations described herein can be used for proof of participation and proof of attendance. For example, a mission provider 501 (event organizer in this example) can airdrop a special NFT to each participant. The mission provider 501 can verify participation at the event through the deployment of custom software on their team's tablets. This software makes the tablets broadcast special Bluetooth beacons which can be exchanged for an NFT via the mission's chain code.

The mission provider 501 may provide a mission 503 for providing rewards to each participant. The mission 503 includes a device code that monitors or listens to the special beacons from the event, which contain a pre-computed secret (e.g., arbitrary set of parameters) from the mission provider 501. The special beacon then sends it to the chain code deployed on the blockchain server 502. The chain code receives these secrets and verifies them and mints a new NFT as part of the event's collection if they are verified.

In this case, operator server 504 may ignore the mission 503 because the NFT's financial value is unclear. However, mission application users may see the mission on their application, and can choose to install it themselves on their phones if they go to the event. Additionally, the mission provider 501 can send an email to the participants, or show a QR Code, which contains a deep link to install the mission directly in the mission application. Alternatively, the mission provider 501 might own a mobile application that could embed the mission application and pre-install their mission.

Once the event is over, the mission provider 501 may deactivate the mission 503 on the blockchain server 502, thus freeing some of the cryptocurrency they had to lock as part of the state rent, and informing the operator server 504 to uninstall the mission 503 from the devices 506 in communication with the operator server 504.

Terms used herein and especially in the appended claims (e.g., bodies of the appended claims) are generally intended as "open" terms (e.g., the term "including" may be interpreted as "including, but not limited to," the term "having" may be interpreted as "having at least," the term "includes" may be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases may not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an" (e.g., "a" and/or "an" may be interpreted to mean "at least one" or "one or more"); the same holds true for the use of definite articles used to introduce claim recitations.

In addition, even if a specific number of an introduced claim recitation is explicitly recited, those skilled in the art will recognize that such recitation may be interpreted to mean at least the recited number (e.g., the bare recitation of "two recitations," without other modifiers, means at least two recitations, or two or more recitations). Further, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, may be understood to contemplate the possibilities of including one of the terms, either of the terms, or both terms. For example, the phrase "A or B" may be understood to include the possibilities of "A" or "B" or "A and B."

Implementations described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions may include, for example, instructions and data which cause a general-purpose computer, special purpose computer, or special purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general purpose hardware (e.g., computer-readable media, processing devices, etc.) of the computing system. In some implementations, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

Terms used in the present disclosure and especially in the appended claims (e.g., bodies of the appended claims) are generally intended as "open terms" (e.g., the term "including" should be interpreted as "including, but not limited to.").

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is expressly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase preceding two or more alternative terms, whether in the description, claims, or drawings, should be understood to contemplate the possibilities of including one of the terms, either of the terms, or both of the terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although implementations of the present disclosure have been described in detail, various changes, substitutions, and alterations could be made hereto without departing from the spirit and scope of the present disclosure.

What is claimed is:

1. A method comprising:
   detecting, by an operator server, a mission at a blockchain server, the blockchain server in communication with the operator server;
   determining, by the operator server, whether the mission meets predefined criteria; and
   in response to a determination that the mission meets the predefined criteria, exposing at least one device to the mission, the at least one device in communication with the operator server.

2. The method of claim 1, the method further comprising:
   obtaining, at the operator server, a device code associated with the mission; and
   providing, by the operator server, the device code to the at least one device in communication with the operator server.

3. The method of claim 2, wherein providing the device code to the at least one device includes:
   causing the device code to execute on a virtual machine of each of the at least one device.

4. The method of claim 1, the method further comprising:
   in response to detecting the mission, obtaining, by the operator server, the mission,
   wherein the mission includes a chain code associated with the mission, a first address information of a device code associated with the mission, and a second address information of metadata associated with the mission.

5. The method of claim 4, the method further comprising:
   obtaining, at the operator server, the device code associated with the mission based on the first address information; and
   obtaining, at the operator server, the metadata associated with the mission based on the second address information.

6. The method of claim 5, wherein determining whether the mission meets predefined criteria includes at least one of:
   determining, by the operator server, whether the device code associated with the mission complies with a restriction; or
   determining, by the operator server, whether the mission complies with a restriction based on the metadata associated with the mission.

7. The method of claim 1, wherein determining whether the mission meets the predefined criteria includes:
   determining, by the operator server, a set of permissions required to carry out the mission; and
   determining, by the operator server, that the set of permissions required to carry out the mission complies with a restriction.

8. The method of claim 1, wherein determining whether the mission meets the predefined criteria includes:
   determining, by the operator server, a reward associated with carrying out the mission complies with a restriction.

9. The method of claim 8, wherein the reward associated with carrying out the mission includes a first reward for the operator server and a second reward for the at least one device.

10. The method of claim 1, the method further comprising:
    maintaining, by the operator sever, a status of one or more devices in communication with the operator server.

11. The method of claim 10, wherein exposing the at least one device to the mission includes exposing the at least one device based on the status of each device in communication with the operator server.

12. A method comprising:
    obtaining, at a device, a device code from an operator server, the device in communication with the operator server, the device code associated with a mission; and
    executing, by the device, the device code to carry out the mission.

13. The method of claim 12, wherein executing the device code includes executing the device code on a virtual machine of the device.

14. The method of claim 12, the method further comprising:
    determining, at the device, whether the device code is provided by the operator server.

15. The method of claim 12, the method further comprising:
    calling back into a chain code on a blockchain server, the chain code associated with the mission.

16. The method of claim 15, wherein calling back into the chain code on the block chain server causes the blockchain server to provide compensation for carrying out the mission.

17. A method comprising:
    obtaining, at a blockchain server, a mission, the mission including a chain code and an address information of a device code;
    wherein the chain code and the device code are associated with the mission, and
    wherein the chain code is configured to execute on the blockchain server.

18. The method of claim 17, the method further comprising:
    in response to obtaining the mission, updating a mission registry of the blockchain server with the mission.

19. The method of claim 18, wherein:
    the mission in the mission registry causes an operator server to determine whether the mission meets predefined criteria, and
    when the operator server determines that the mission meets the predefined criteria, the operator sever exposes at least one device to the mission, the at least one device in communication with the operator server.

20. The method of claim 19, wherein:
    the operator server exposes the at least one device to the mission by providing the device code, the at least one device in communication with the operator server.

* * * * *